(12) United States Patent
Matsumura

(10) Patent No.: US 9,527,441 B2
(45) Date of Patent: Dec. 27, 2016

(54) VEHICLE CONTROL APPARATUS

(71) Applicant: TOYOTA JIDOSHA KABUSHIKI KAISHA, Toyota-shi, Aichi-ken (JP)

(72) Inventor: Takeshi Matsumura, Numazu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/084,610

(22) Filed: Mar. 30, 2016

(65) Prior Publication Data

US 2016/0288707 A1    Oct. 6, 2016

(30) Foreign Application Priority Data

Apr. 1, 2015    (JP) ................. 2015-075170

(51) Int. Cl.
*B60Q 9/00* (2006.01)
*B60W 10/04* (2006.01)
*B60W 10/20* (2006.01)
*B60W 40/08* (2012.01)

(52) U.S. Cl.
CPC ............... *B60Q 9/00* (2013.01); *B60W 10/04* (2013.01); *B60W 10/20* (2013.01); *B60W 40/08* (2013.01); *B60W 2040/0827* (2013.01); *B60W 2540/26* (2013.01); *B60W 2710/20* (2013.01); *B60W 2710/30* (2013.01); *B60W 2720/10* (2013.01)

(58) Field of Classification Search
CPC ......... B60Q 9/00; B60W 10/04; B60W 10/20; B60W 2040/0827; B60W 2540/26; B60W 2710/20; B60W 2710/30; B60W 2720/10

USPC .......................................................... 701/41
See application file for complete search history.

(56) References Cited

U.S. PATENT DOCUMENTS

| | | | | |
|---|---|---|---|---|
| 2005/0242965 | A1 | 11/2005 | Rieth et al. | |
| 2014/0111324 | A1* | 4/2014 | Lisseman | B62D 1/046 340/435 |
| 2014/0111325 | A1* | 4/2014 | Lisseman | B60Q 3/024 340/435 |
| 2016/0176400 | A1* | 6/2016 | Nakano | B62D 15/025 701/41 |
| 2016/0176440 | A1* | 6/2016 | Witte | B62D 6/002 701/23 |

(Continued)

FOREIGN PATENT DOCUMENTS

| | | |
|---|---|---|
| JP | 07-025301 A | 1/1995 |
| JP | 2005-537992 A | 12/2005 |
| JP | 4666631 B2 | 1/2011 |

*Primary Examiner* — McDieunel Marc
*Assistant Examiner* — James E Stroud
(74) *Attorney, Agent, or Firm* — Sughrue Mion, PLLC

(57) ABSTRACT

A vehicle control apparatus includes a departure margin time computation unit configured to compute a departure margin time until the vehicle departs from the running lane in a previously set steering control range and vehicle speed control range, a hand-release duration time measurement unit configured to measure a hand-release duration time, a driving return time estimation unit configured to estimate a driving return time until the driver in the hand-release state returns to driving operation, based on the hand-release duration time, and a control unit configured to output an alarm to the driver when a difference resulting from subtracting the driving return time from the departure margin time is a first threshold or less.

6 Claims, 8 Drawing Sheets

(56) References Cited

U.S. PATENT DOCUMENTS

2016/0180714 A1* 6/2016 Fu ..................... B62D 15/025
                                                701/41
2016/0225261 A1* 8/2016 Matsumoto ............ G08G 1/167
2016/0243985 A1* 8/2016 Fung ..................... B60Q 9/00

* cited by examiner

VEHICLE CONTROL APPARATUS

CROSS REFERENCE TO RELATED APPLICATIONS

This application claims priority from Japanese Patent Application No. 2015-075170 filed on Apr. 1, 2015, the disclosure of which including the specification, drawings and abstract is incorporated herein by reference in its entirety.

BACKGROUND

1. Field

This disclosure relates to a vehicle control apparatus that controls a vehicle such that the vehicle runs along a running lane.

2. Description of Related Art

In a vehicle control apparatus that controls a vehicle such that the vehicle runs along a running lane, the vehicle runs without requiring the driving operation, and therefore, a driver is sometimes in a hand-release state in which the driver has released his hands from a steering wheel. As for such a hand-release state, Japanese Patent Application Publication No. 7-25301 describes an apparatus that raises an alarm in the case where the driver continues the hand-release state for a given time or more.

However, in the above-described related apparatus, the situation of the vehicle is not considered. Therefore, even when the vehicle is running along a sharp curve on a narrow road or even when the vehicle is going straight on a wide road, regardless of the situation, the alarm is performed in the same way depending on the time during which the driver continues the hand-release state. Therefore, there is a possibility that the alarm is performed at an improper timing that is not appropriate to the situation of the vehicle.

SUMMARY

The disclosure provides a vehicle control apparatus that performs an alarm appropriate to the situation of the vehicle.

According to a first aspect of the disclosure a vehicle control apparatus is configured to control a vehicle such that the vehicle runs along a running lane in a steering control range and a vehicle speed control range, the steering control range and the vehicle speed control range being previously set, the vehicle control apparatus includes: a running state recognition unit configured to recognize a running state of the vehicle; a lateral position recognition unit configured to recognize a lateral position of the vehicle relative to the running lane and an orientation of the vehicle relative to the running lane; a departure margin time computation unit configured to compute a departure margin time based on the running state of the vehicle, the lateral position of the vehicle relative to the running lane and the orientation of the vehicle relative to the running lane, the departure margin time being a time until the vehicle departs from the running lane in the steering control range and the vehicle speed control range; a hand-release duration time measurement unit configured to measure a hand-release duration time, the hand-release duration time being a duration time of a hand-release state of a driver of the vehicle; a driving return time estimation unit configured to estimate a driving return time based on the hand-release duration time, the driving return time being a time until the driver in the hand-release state returns to driving operation; and a control unit configured to output an alarm to the driver in a case where a difference resulting from subtracting the driving return time from the departure margin time is a first threshold or less.

According to the vehicle control apparatus, in consideration of the case where an abnormality such as a false recognition occurs in the apparatus, the alarm is output to the driver, in the case where the difference resulting from subtracting the driving return time for the driver from the departure margin time, which is the time until the vehicle departs from the running lane in the steering control range and vehicle speed control range that can be controlled by the apparatus, is the first threshold or less. Therefore, according to the vehicle control apparatus, it is possible to output the alarm at a timing that is scheduled in terms of the departure of the vehicle from the running lane, compared to the related apparatus that outputs the alarm in a given time in the case where the driver is in the hand-release state.

In the above-described vehicle control apparatus according to the first aspect of the disclosure, the control unit may be configured to execute an extension control of the departure margin time by at least one of deceleration of the vehicle and restriction of the steering control range, in a case where the difference resulting from subtracting the driving return time from the departure margin time is a second threshold or less. Since the vehicle control apparatus executes the extension control of the departure margin time in the case where the difference resulting from subtracting the driving return time from the departure margin time is the second threshold or less, it is possible to secure the time for the driver to return to the driving operation before the vehicle departs from the running lane, even when an abnormality such as a false recognition occurs in the apparatus while the driver continues the hand-release state for example.

The above-described vehicle control apparatus according to the first aspect of the disclosure may further include a driver state recognition unit configured to recognize whether the driver is in a low awake state, and the driving return time estimation unit may be configured to estimate, in a case where the driver is recognized to be in the low awake state by the driver state recognition unit, the driving return time to be longer than in a case where the driver is recognized to be not in the low awake state. Since the time to return the driving operation in response to the alarm is long in the case where the driver is in the low awake state (for example, a sleep state), the vehicle control apparatus estimates the driving return time to be a longer time, in the case where the driver is recognized to be in the low awake state. Thereby, it is possible to estimate the driving return time corresponding to the state of the driver.

The above-described vehicle control apparatus according to the first aspect of the disclosure may further include: an obstacle information acquisition unit configured to acquire obstacle information relevant to an obstacle around the vehicle; and a contact margin time computation unit configured to compute a contact margin time based on the running state of the vehicle and the obstacle information, the contact margin time being a time until the vehicle comes into contact with the obstacle in the steering control range and the vehicle speed control range, and the control unit may be configured to output the alarm to the driver in a case where a difference resulting from subtracting the driving return time from the contact margin time is a third threshold or less. According to the vehicle control apparatus, in consideration of the case where an abnormality such as a false recognition occurs in the apparatus, the alarm is output to the driver, in the case where the difference resulting from subtracting the driving return time for the driver from the contact margin time, which is the time until the vehicle comes into contact with the obstacle in the steering control range and vehicle speed control range that can be controlled by the apparatus, is the third threshold or less. Therefore, according to the vehicle control apparatus, it is possible to output the alarm at a timing that is scheduled in terms of the contact between the vehicle and the obstacle, and to prevent the alarm from giving the driver a feeling of strangeness, compared to the related apparatus that outputs the alarm in a given time in the case where the driver is in the hand-release state.

According to a second aspect of the disclosure a vehicle control apparatus is configured to control a vehicle such that the vehicle runs along a running lane in a steering control range and a vehicle speed control range, the steering control range and the vehicle speed control range being previously set, the vehicle control apparatus including: a running state recognition unit configured to recognize a running state of the vehicle; an obstacle information acquisition unit configured to acquire obstacle information relevant to an obstacle around the vehicle; a contact margin time computation unit configured to compute a contact margin time based on the running state of the vehicle and the obstacle information, the contact margin time being a time until the vehicle comes into contact with the obstacle in the steering control range and the vehicle speed control range; a hand-release duration time measurement unit configured to measure a hand-release duration time, the hand-release duration time being a duration time of a hand-release state of a driver of the vehicle; a driving return time estimation unit configured to estimate a driving return time for the driver based on the hand-release duration time; and a control unit configured to output an alarm to the driver in a case where a difference resulting from subtracting the driving return time from the contact margin time is a third threshold or less.

According to the vehicle control apparatus, in consideration of the case where an abnormality such as a false recognition occurs in the apparatus, the alarm is output to the driver, in the case where the difference resulting from subtracting the driving return time for the driver from the contact margin time, which is the time until the vehicle comes into contact with the obstacle in the steering control range and vehicle speed control range that can be controlled by the apparatus, is the third threshold or less. Therefore, according to the vehicle control apparatus, it is possible to output the alarm at a timing that is scheduled in terms of the contact between the vehicle and the obstacle, compared to the related apparatus that outputs the alarm in a given time in the case where the driver is in the hand-release state.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the drawings.

Figure 1:
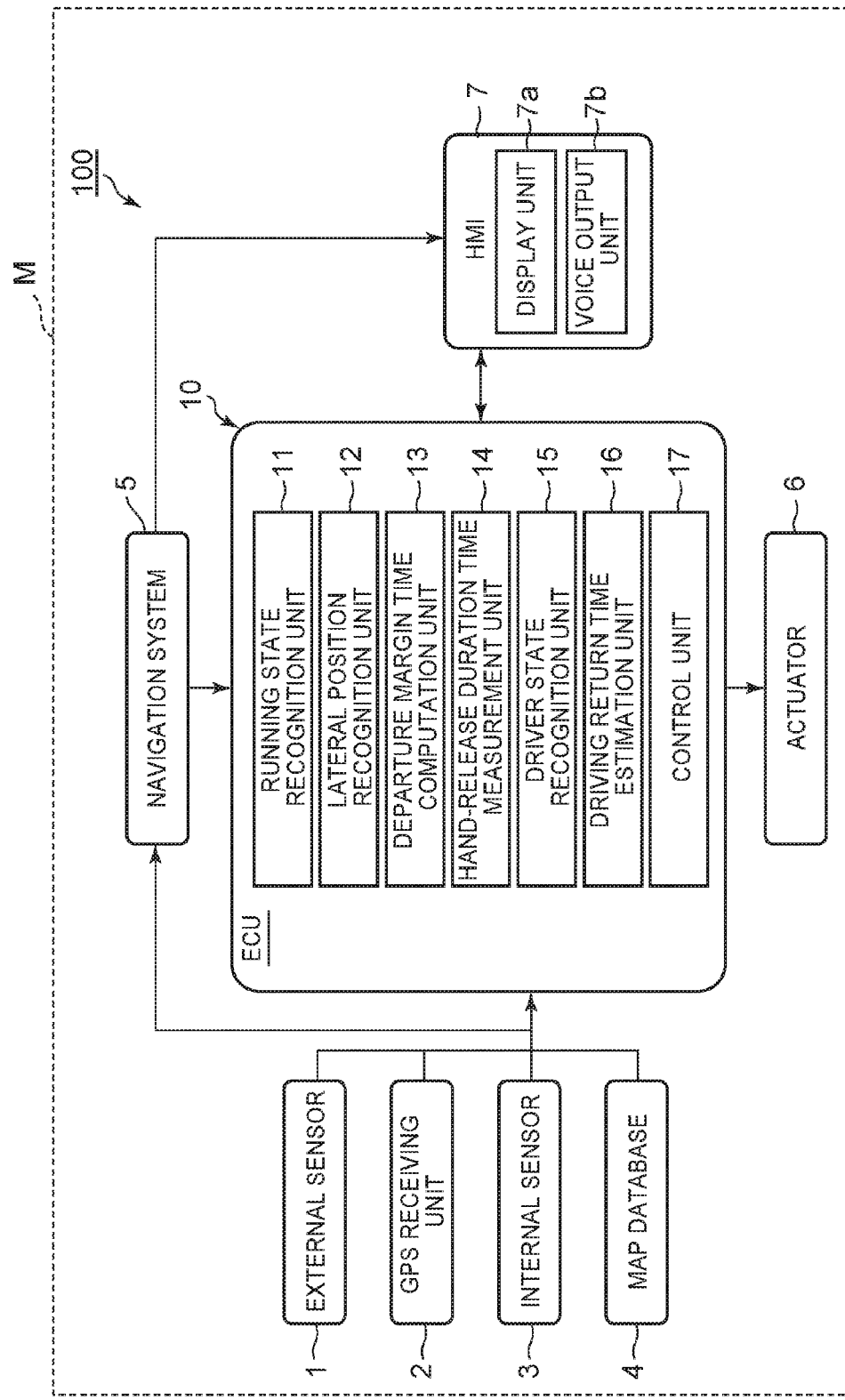
FIG. 1 is a block diagram showing a vehicle control apparatus according to a first exemplary embodiment.

FIG. 1 is a block diagram showing a vehicle control apparatus according to a first exemplary embodiment. A vehicle control apparatus 100 shown in FIG. 1, which is mounted in a vehicle M such as a passenger car, controls the running of the vehicle M. The vehicle control apparatus 100, for example, performs a lane keeping assist (Lane Trace Control (LTC) of making the vehicle M run along a running lane on which the vehicle M is running. The lane keeping assist, for example, is a driving assist of controlling a vehicle such that the lateral position of the vehicle is a target lateral position in a running lane, and therewith, when a driver performs a steering, reflecting the steering on the running of the vehicle. The lateral position of the vehicle is the position of the vehicle in the width direction of the running lane. The target lateral position, for example, is set to a central position of the running lane in the width direction of the running lane. Further, the target lateral position may be set to a position that is offset from the central position of the running lane in the width direction of the lane.

Here, the vehicle control apparatus 100 may perform an automatic driving of making the vehicle M automatically run toward a destination that is previously set on a map. That is, the content of the embodiment can be applied also to the vehicle M during the automatic driving.

The vehicle control apparatus 100, for example, controls the vehicle M such that the vehicle M runs along the running lane in a steering control range and a vehicle speed control range that are previously set when the driver turns on the LTC or the automatic driving. The steering control range is a range in which the vehicle control apparatus 100 is allowed to control the steering of the vehicle M in the vehicle control for the LTC or the automatic driving. The steering control range, for example, includes at least one of the control range of steering angle, the control range of change rate of the steering angle, the control range of steering torque, and the control range of change rate of the steering torque. Similarly, the vehicle speed control range is a range in which the vehicle control apparatus 100 is allowed to control the vehicle speed or acceleration of the vehicle M in the vehicle control for the LTC or the automatic driving. The vehicle speed control range, for example, includes the control range of the vehicle speed and the control range of the acceleration (deceleration). The steering control range and the vehicle speed control range may be fixed ranges, or the ranges may be altered depending on the alteration of setting by the driver or the running situation of the vehicle M.

The vehicle control apparatus 100 computes a departure margin time while controlling the vehicle M such that the vehicle M runs along the running lane. The departure margin time is a time (for example, the minimum time) until the vehicle M departs from the running lane in the above-described steering control range and vehicle speed control range. For example, if an abnormality such as a false recognition of a surrounding situation occurs in the vehicle control apparatus 100 and the vehicle control apparatus 100 controls the vehicle M such that the vehicle M goes toward a lane boundary of the running lane in the steering control range and the vehicle speed control range, the departure margin time corresponds to the minimum time until the vehicle M departs from the running lane. The departure margin time may be the minimum time until the vehicle M departs from the running lane by the control of the steering from the vehicle control apparatus 100 while the current vehicle speed is maintained. The minimum time herein is not the minimum time until the vehicle M departs from the running lane actually, but the computed minimum time until the vehicle M departs from the running lane hypothetically. The minimum time varies depending on computation technique or the setting of parameters to be used for the computation.

The vehicle control apparatus 100 computes the departure margin time, for example, based on the running state of the vehicle M (the state of vehicle speed, acceleration, yaw rate and the like), the lateral position of the vehicle M relative to the running lane, and the orientation of the vehicle M relative to the running lane (the orientation of the vehicle M relative to a white line forming the running lane). Here, the state of departing from the running lane, for example, can be a state in which at least a front edge of the vehicle M exceeds the white line (a lane line, a vehicular lane line, or the like) forming the running lane. The state of departing from the running lane may be a state in which the vehicle M is on the white line.

Figure 2:
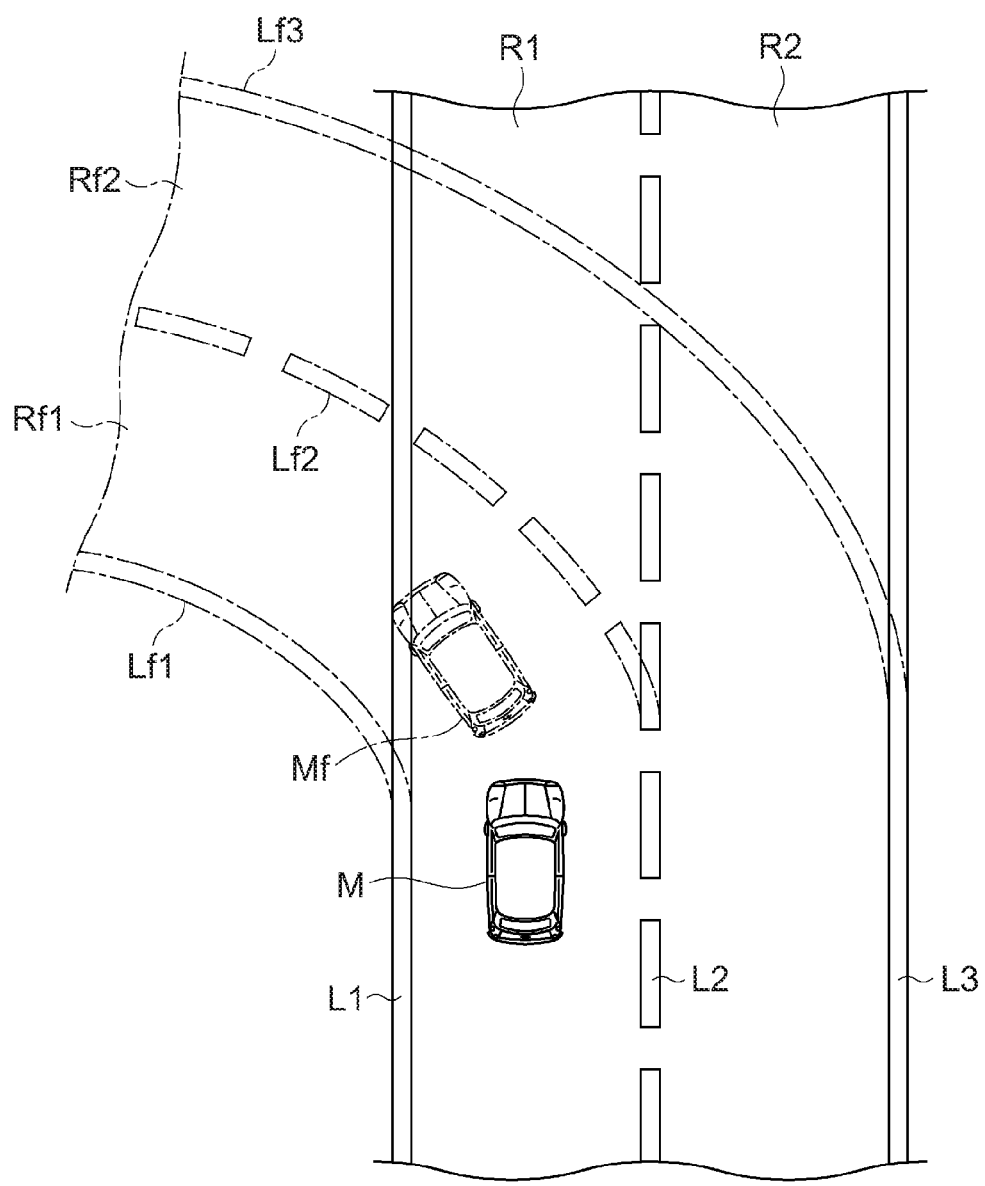
FIG. 2 is a plan view for describing a departure margin time.

Here, FIG. 2 is a plan view for describing the departure margin time. FIG. 2 shows a running lane R1 along which the vehicle M runs, an adjacent lane R2 that is adjacent to the right side of the running lane R1, white lines L1, L2 that form the running lane R1, and a white line L3 that forms the adjacent lane R2 together with the white line L2. Further, FIG. 2 shows a running lane Rf1, an adjacent lame Rf2 and white lines Lf1 to Lf3 in the case where the vehicle control apparatus 100 performs a false recognition hypothetically, and a position Mf of the vehicle M in the case of running along the running lane Rf1.

FIG. 2 shows a case where, although the actual running lane R1 and the adjacent lane R2 are straight roads, the vehicle control apparatus 100 falsely recognizes the running lane Rf1 and adjacent lane Rf2 that are left-hand curves, to control the vehicle M. The running lane Rf1 and the adjacent lane Rf2 are hypothetical lanes that are falsely recognized by the vehicle control apparatus 100 in the case of departing from the actual running lane R1 in the shortest time from the current position of the vehicle M. That is, the running lane Rf1 and the adjacent lane Rf2 vary depending on not only the actual road shape but also the running state of the vehicle M and the steering control range and vehicle speed control range of the vehicle control apparatus 100. Here, the vehicle control apparatus 100 does not need to obtain the virtual running lane Rf1 and the adjacent lane Rf2 by computation.

In the situation shown in FIG. 2, the vehicle control apparatus 100 computes the departure margin time, based on the running state of the vehicle M, the lateral position of the vehicle M relative to the running lane R1, and the orientation of the vehicle M relative to the running lane R1. The vehicle control apparatus 100, for example, computes the departure margin time at a previously set interval, during the execution of the LTC.

Further, the vehicle control apparatus 100 determines whether the driver is in a hand-release state. The hand-release state, for example, is a state in which the driver has released his hands from a steering wheel. The vehicle control apparatus 100, for example, determines whether the driver is in the hand-release state, based on a signal from a steering touch sensor provided on the steering wheel. Here, in the case where an operation of a shift lever or a winker lever by the driver is detected, the vehicle control apparatus 100 may determine that the driver is not in the hand-release state, even when the driver has released his hands from the steering wheel. Similarly, in the case where an accelerator pedal operation or a brake pedal operation is detected, the vehicle control apparatus 100 may determine that the driver is not in the hand-release state.

In the case of determining that the driver is in the hand-release state, the vehicle control apparatus 100 starts the measurement of a hand-release duration time. The hand-release duration time is a time during which the driver continues the hand-release state. The vehicle control apparatus 100 estimates a driving return time based on the hand-release duration time. The driving return time is a time until the driver in the hand-release state returns to the driving operation. The return to the driving operation, for example, is that the driver in the hand-release state becomes aware of the abnormality of the vehicle control and holds the steering wheel. The return to the driving operation may be that the driver in the hand-release state becomes aware of the abnormality of the vehicle control and performs an operation of canceling the vehicle control such as the LTC. The operation of canceling the vehicle control may be an operation to a cancel button by the driver, or may be an override by the driver. The override is an operation of canceling the vehicle control, for example, by turning the steering wheel to a previously set steering threshold or more, or by stepping the brake pedal or accelerator pedal to a previously set stepping threshold or more.

The vehicle control apparatus 100 determines whether a difference resulting from subtracting the driving return time from the departure margin time is a first threshold or less. The difference resulting from subtracting the driving return time from the departure margin time can be a negative value. The first threshold is a threshold that is set for outputting an alarm to the driver in the hand-release state at a proper timing. The first threshold may be a fixed value, or may be a variable value. The first threshold may be zero, or may be a negative value. As the first threshold, for example, a greater value may be adopted as the vehicle speed of the vehicle M or the acceleration of the vehicle M increases. For example, in the case where the shape of a road along which the vehicle M is running is a curve shape, a greater value may be adopted as the first threshold, compared to the case where the road shape is a straight shape. By adopting a greater value as the first threshold, it is possible to advance the timing of the alarm. Increasing the first threshold is equivalent to shortening the departure margin time by the weighting of the departure margin time.

In the case of determining that the difference resulting from subtracting the driving return time from the departure margin time is the first threshold or less, the vehicle control apparatus 100 outputs the alarm to the driver in the hand-release state. The alarm, for example, is a voice output or an image display that prompts the driver to hold the steering wheel.

In the case of determining that the difference resulting from subtracting the driving return time from the departure margin time is a second threshold or less, the vehicle control apparatus 100 may perform an extension control of the departure margin time. The extension control of the departure margin time, for example, is a control of extending the departure margin time by at least one of the deceleration of the vehicle M and the restriction of the steering control range. The restriction of the steering control range, for example, is to narrow the range of the steering torque control by the vehicle control apparatus 100 and the range of the steering torque change rate control by the vehicle control apparatus 100. The restriction of the steering control range may be to narrow the range of the steering angle control and the range of the steering angle change rate control. Here, both of the deceleration of the vehicle M and the restriction of the steering control range may be performed as the extension control of the departure margin time.

The second threshold may be a fixed value, or may be a variable value. The second threshold may be zero, or may be a negative value. The second threshold may be the same value as the first threshold. In this case, the vehicle control apparatus 100 executes the extension control of the departure margin time, simultaneously with the output of the alarm.

Further, the second threshold may be a value less than the first threshold. In this case, the vehicle control apparatus 100 executes the extension control of the departure margin time, when the driver continues the hand-release state even after the output of the alarm and the vehicle control apparatus 100 determines that the difference resulting from subtracting the driving return time from the departure margin time is the second threshold or less. Here, the extension control of the departure margin time is not repeated unlimitedly, but for example, is executed only once or twice for one continuation of the hand-release state of the driver. The extension control of the departure margin time may be performed repeatedly until the number of times reaches a previously set number, or may be performed repeatedly until the speed of the vehicle M becomes a previously set speed (for example, 40 km/h) or less.

Further, the vehicle control apparatus 100 may perform the extension control of the departure margin time before the output of the alarm. That is, the second threshold may be a value greater than the first threshold. The vehicle control apparatus 100, for example, performs the extension control of the departure margin time only once. Thereafter, the vehicle control apparatus 100 outputs the alarm, in the case of determining that the difference resulting from subtracting the driving return time from the departure margin time is the first threshold or less.

In the following, a configuration of the vehicle control apparatus 100 according to the first embodiment will be described with reference to FIG. 1. As shown in FIG. 1, the vehicle control apparatus 100 includes an external sensor 1, a GPS [Global Positioning System] receiving unit 2, an internal sensor 3, a map database 4, a navigation system 5, an actuator 6, an HMI [Human Machine Interface] 7, and an ECU [Electronic Control Unit] 10.

The external sensor 1 is detection equipment to detect the external situation that is the surrounding information of the vehicle M. The external sensor 1 includes at least a camera. The camera, for example, is provided on the back side of a windshield of the vehicle M. The camera sends the imaging information relevant to the external situation of the vehicle M, to the ECU 10. The camera may be a monocular camera, or may be a stereo camera. The stereo camera includes two imaging units (e.g., at least two cameras) arranged such that binocular parallax is reproduced.

The external sensor 1 may include a radar or a LIDAR [Laser Imaging Detection and Ranging]. The radar detects an obstacle outside the vehicle M, using a radio wave (for example, a millimeter wave). The radar detects the obstacle by sending the radio wave around the vehicle M and receiving the radio wave reflected by the obstacle. The radar sends the detected obstacle information to the ECU 10.

The LIDAR detects an obstacle outside the vehicle M, using light. The LIDAR detects the obstacle by sending light around the vehicle M and receiving the light reflected by the obstacle to measure the distance to the obstacle. The LIDAR sends the detected obstacle information to the ECU 10.

The GPS receiving unit 2 may be a receiver that receives signals from three or more GPS satellites, and thereby, measures the position of the vehicle M (for example, the latitude and longitude of the vehicle M). The GPS receiving unit 2 sends the measured position information about the vehicle M, to the ECU 10. Here, other means that can identify the latitude and longitude of the vehicle M may be used, instead of the GPS receiving unit 2.

The internal sensor 3 is detection equipment to detect the running state of the vehicle M and the driving operation by the driver. The internal sensor 3, for example, includes a speed sensor, an acceleration sensor and a yaw rate sensor. The speed sensor is a detector to detect the speed of the vehicle M. As the speed sensor, for example, a wheel speed sensor that is provided at a wheel of the vehicle M, a drive shaft to rotate integrally with the wheel or the like and that detects the rotational speed of the wheel is used. The speed sensor sends the detected vehicle speed information (wheel speed information), to the ECU 10.

The acceleration sensor is a detector to detect the acceleration of the vehicle M. The acceleration sensor, for example, includes a front-back acceleration sensor to detect the acceleration in the front-back direction of the vehicle M, and a lateral acceleration sensor to detect the lateral acceleration of the vehicle M. The acceleration sensor sends the acceleration information about the vehicle M, to the ECU 10. The yaw rate sensor is a detector to detect the yaw rate (rotational angular velocity) around the vertical axis of the gravity center of the vehicle M. As the yaw rate sensor, for example, a gyro sensor can be used. The yaw rate sensor sends the detected yaw rate information about the vehicle M, to the ECU 10.

Further, the internal sensor 3, for example, includes a steering torque sensor, a steering angle sensor, a steering touch sensor, an accelerator pedal sensor, and a brake pedal sensor. For example, the steering torque sensor and the steering angle sensor, which are provided at a steering shaft of the vehicle M, detect the steering torque given to the steering wheel by the driver and the steering angle of the steering wheel, respectively. It is only necessary to include any one of the steering torque sensor and the steering angle sensor. For example, the steering touch sensor, which is provided on the steering wheel of the vehicle M, detects the contact of the driver with the steering wheel and the holding pressure of the driver on the steering wheel. As the steering touch sensor, for example, a pressure-sensitive sensor can be used. The steering torque sensor, the steering angle sensor and the steering touch sensor send the detected steering information about the steering by the driver, to the ECU 10.

For example, the accelerator pedal sensor, which is provided at a shaft part of the accelerator pedal, detects the stepping quantity to the accelerator pedal (the position of the accelerator pedal). The accelerator pedal sensor sends a signal corresponding to the detected stepping quantity of the accelerator pedal, to the ECU 10. For example, the brake pedal sensor, which is provided at a shaft part of the brake pedal, detects the stepping quantity to the brake pedal (the position of the brake pedal). The operation force to the brake pedal (the stepping force to the brake pedal, the pressure of a master cylinder or the like) may be detected. The brake pedal sensor sends the brake operation information relevant to the detected stepping quantity or operation quantity to the brake pedal, to the ECU 10. In addition, the internal sensor 3 may include a shift lever sensor to detect the operation of a shift lever, and may include a direction indicator sensor to detect the operation of a direction indicator.

Furthermore, the internal sensor 3 may include a driver monitoring camera to image the driver. The driver monitoring camera, for example, is provided at a position that is on a cover of a steering column of the vehicle M and that is in front of the driver. Multiple driver monitoring cameras may be provided for imaging the driver from multiple directions. The driver monitoring camera sends the imaging information about the driver, to the ECU 10.

The map database 4 is a database including map information. The map database, for example, is formed in an HDD [Hard Disk Drive] that is mounted in the vehicle. The map information, for example, includes the position information about roads, the information about road shapes (for example, types of curves and straight parts, curvatures of curves or the like), and the position information about intersections and crossroads. The map information may include the width information about roads, and may include the position information about shield structures such as buildings and walls. Here, the map database 4 does not always need to be mounted in the vehicle M, and may be stored in a computer that is in a facility such as an information processing center and that can communicate with the vehicle M.

The navigation system 5 is an apparatus to guide the driver of the vehicle M, to a destination set by the driver of the vehicle M. The navigation system 5 calculates a route along which the vehicle M runs, based on the position information about the vehicle M measured by the GPS receiving unit 2 and the map information of the map database 4. As the route, an appropriate lane may be specified in a section of multiple lanes. The navigation system 5, for example, computes a target route from the position of the vehicle M to the destination, and informs the driver of the target route by the indication on a display or the voice output from a speaker. The target route may include the information about sections at which the vehicle M should perform lane change. The navigation system 5, for example, sends the information about the target route for the vehicle M, to the ECU 10. The navigation system 5 is used, for example, when the vehicle control apparatus 100 performs the automatic driving. The navigation system 5 may include a communication unit to perform wireless communication with other vehicles or facilities such as information processing centers. Here, the vehicle control apparatus 100 does not always need to include the navigation system 5.

The actuator 6 is equipment to execute the running control of the vehicle M. The actuator 6 includes, at least, a throttle actuator, a brake actuator and a steering actuator. The throttle actuator controls the supply rate of air for an engine (throttle opening angle) in response to a control signal from the ECU 10, and controls the driving force of the vehicle M. Here, in the case where the vehicle M is a hybrid vehicle or an electric vehicle, the throttle actuator is not included, and the control signal from the ECU 10 is input to a motor that is a dynamic power source, so that the driving force is controlled.

The brake actuator controls a brake system in response to a control signal from the ECU 10, and controls the braking force that is given to wheels of the vehicle M. As the brake system, for example, a hydraulic brake system can be used. The steering actuator controls the drive of an assist motor that is of an electric power steering system and that controls the steering torque, in response to a control signal from the ECU 10. Thereby, the steering actuator controls the steering torque of the vehicle M.

The HMI 7 is an interface for performing the input and output of information between the driver and the vehicle control apparatus 100. The HMI 7 is an interface for performing the input and output of information between an occupant (including the driver) in the vehicle M and the vehicle control apparatus 100. The HMI 7, for example, includes a display unit 7a for displaying image information for the driver, a voice output unit 7b for voice output, an operation button or a touch panel by which the occupant performs input operation. The display unit 7a may be configured by multiple kinds of displays. For example, the display unit 7a includes at least one of a MID of a combination meter, a center display of an instrument panel, a HUD [Head Up Display], a glass-type wearable display that the driver wears, and the like. The display unit 7a displays the image information in response to a control signal from the ECU 10. The voice output unit 7b is a speaker for giving notice to the driver by the output of alarm sound or voice. The voice output unit 7b may be configured by multiple speakers, and may be configured to include a speaker fixed to the vehicle M. For example, the voice output unit 7b includes at least one of a speaker provided on the back side of the instrument panel of the vehicle M, a speaker provided on the inner side of a door at a driver seat in the vehicle M, and the like. The voice output unit 7b outputs the alarm sound or voice to the driver, in response to a control signal from the ECU 10. Here, the display unit 7a and the voice output unit 7b do not always need to constitute a part of the HMI 7.

Next, a functional configuration of the ECU 10 will be described. The ECU 10 is an electronic control unit including a CPU [Central Processing Unit], a ROM [Read Only Memory], a RAM [Random Access Memory], and the like. In the ECU 10, a program stored in the ROM is loaded into the RAM and is executed by the CPU, and thereby, various controls are executed. The ECU 10 may be configured by multiple electronic control units. Here, some of the functions of the ECU 10 may be performed by a computer that is in a facility such as an information processing center and that can communicate with the vehicle M.

The ECU 10 includes a running state recognition unit 11, a lateral position recognition unit 12, a departure margin time computation unit 13, a hand-release duration time measurement unit 14, a driver state recognition unit 15, a driving return time estimation unit 16, and a control unit 17. The units of the ECU 10 may comprise circuitry configured to perform the respective functions of the units, one or more processors configured to perform the respective functions, etc.

The running state recognition unit 11 recognizes the running state of the vehicle M, based on the detection result of the internal sensor 3. The running state of the vehicle M includes at least the vehicle speed of the vehicle M and the yaw rate of the vehicle M. The running state of the vehicle M may include the acceleration (deceleration) of the vehicle M. The running state recognition unit 11, for example, recognizes the vehicle speed of the vehicle M, based on the vehicle speed information of the speed sensor. The running state recognition unit 11, for example, recognizes the yaw rate of the vehicle M, based on the yaw rate information of the yaw rate sensor. The running state recognition unit 11, for example, recognizes the acceleration of the vehicle M, based on the acceleration information of the acceleration sensor.

The lateral position recognition unit 12 recognizes the lateral position of the vehicle M relative to the running lane R1 and the orientation of the vehicle M relative to the running lane R1, based on the detection result of the external sensor 1. The lateral position recognition unit 12, for example, recognizes the white lines L1, L2 of the running lane R1, based on the imaging information of the camera. The lateral position recognition unit 12, for example, recognizes the lateral position that is the intervals in the lateral direction (the width direction of the running lane R1) between the white lines L1, L2 and the vehicle M, based on the imaging information of the camera, by a well-known image processing technique. Further, the lateral position recognition unit 12, for example, recognizes the orientation of the vehicle M relative to the running lane R1 (the orientation of the vehicle M relative to the white line L1 or the white line L2), based on the imaging information of the camera, by a well-known image processing technique. Here, the lateral position recognition unit 12 does not always need to use the imaging information of the camera, and may use the white line recognition by the radar.

The departure margin time computation unit 13 computes the departure margin time, which is the time until the vehicle M departs from the running lane R1 in the steering control range and the vehicle speed control range. The departure margin time computation unit 13, for example, computes the departure margin time, based on the running state of the vehicle M and the lateral position and orientation of the vehicle M relative to the running lane R1. The departure margin time computation unit 13, for example, computes the departure margin time, by combining well-known techniques (an optimization technique and the like). Here, in the case where the steering control range and the vehicle speed control range vary depending on the situation, the departure margin time computation unit 13 computes the departure margin time with reference to the current steering control range and the vehicle speed control range. Furthermore, with reference to the map information, the departure margin time computation unit 13 may compute the departure margin time, based on the shape of a road in front of the vehicle M. Furthermore, the departure margin time computation unit 13 may compute the departure margin time, based on the road width of the running lane R1 and the curvature of the running lane R1. The departure margin time computation unit 13, for example, recognizes the road width of the running lane R1 and the curvature of the running lane R1, based on the position information about the vehicle M and the map information.

The departure margin time computation unit 13, for example, may perform the computation for both of a case where the vehicle M departs from the white line L1 on the left side of the running lane R1 and a case where the vehicle M departs from the white line L2 on the right side of the running lane R1. In this case, for example, the departure margin time computation unit 13 adopts the shorter one of the times, as the departure margin time. Further, the departure margin time computation unit 13 may recognize a white line closer to the vehicle M, of the white line L1 and the white line L2, based on the lateral position of the vehicle M relative to the running lane R1, and may compute the departure margin time for the case where the vehicle M departs from the white line closer to the vehicle M.

The hand-release duration time measurement unit 14 measures the hand-release duration time for the driver. First, the hand-release duration time measurement unit 14 determines whether the driver is in the hand-release state, based on the detection result of the internal sensor 3. The hand-release duration time measurement unit 14, for example, determines whether the driver is in the hand-release state, based on the detection result of the steering touch sensor. In the case of recognizing that the driver is not holding the steering wheel from the detection result of the steering touch sensor, the hand-release duration time measurement unit 14 determines that the driver is in the hand-release state.

Even in the case of recognizing that the driver is not holding the steering wheel from the detection result of the steering touch sensor, the hand-release duration time measurement unit 14 may determine that the driver is not in the hand-release state, when the driving operation by the driver is detected based on detection results of the accelerator pedal sensor, the brake pedal sensor and the like. The driving operation may include the operation of the shift lever and the operation of the direction indicator. The driving operation can include the input operation to the navigation system 5 and the input operation to the HMI 7.

Here, the hand-release duration time measurement unit 14 may determine that the driver in the hand-release state, in the case of recognizing that the driver is not performing any driving operation based on the detection results of the steering torque sensor, the accelerator pedal sensor and the brake pedal sensor. In this case, the steering touch sensor is unnecessary. In the case of determining that the driver is in the hand-release state, the hand-release duration time measurement unit 14 starts the measurement of the hand-release duration time, which is a time during which the driver continues the hand-release state. In the case of determining that the driver is not in the hand-release state after starting the measurement of the hand-release duration time, the hand-release duration time measurement unit 14 completes the measurement of the hand-release duration time.

The driver state recognition unit 15 recognizes the state of the driver. The driver state recognition unit 15, for example, recognizes whether the driver is in a low awake state, based on the imaging information of the driver monitoring camera. The low awake state, for example, is a state in which the driver is in a daze because of sleep deprivation or the like. The low awake state includes a sleep state also. The driver state recognition unit 15 can recognize, by a well-known technique, whether the driver is in the low awake state, based on the eye-opening condition and others of the driver that are obtained from the imaging information of the driver monitoring camera. The driver state recognition unit 15 may recognize whether the driver is in the low awake state, from the heartbeat information or brain wave information about the driver that is acquired, through wireless communication, by the communication with a wearable device worn by the driver or a portable information terminal. The driver state recognition unit 15 can recognize, by a well-known technique, whether the driver is in the low awake state, based on a variety of information.

Further, the driver state recognition unit 15, for example, recognizes whether the driver is in a look-away state, based on the imaging information of the driver monitoring camera. The look-away state, for example, is a state in which the driver orients his face in a direction other than the forward direction of the vehicle M. The driver state recognition unit 15 can recognize whether the driver is in the look-away state, for example, by performing an eye-gaze detection for the driver from the imaging information of the driver monitoring camera by a well-known technique. In the case of recognizing that the driver is operating a portable information terminal by the communication with the portable information terminal through wireless communication, the driver state recognition unit 15 may recognize that the driver is in the look-away state. The driver state recognition unit 15 can recognize, by a well-known technique, whether the driver is in the look-away state, based on a variety of information.

Furthermore, the driver state recognition unit 15 may recognize the posture of the driver. The driver state recognition unit 15, for example, recognizes whether the posture of the driver is an appropriate posture to the driving operation, based on the imaging information of the driver monitoring camera. The driver state recognition unit 15 recognizes whether the posture of the driver is an appropriate posture to the driving operation, for example, from the positions of the driver's legs, the angle of the backrest of the seat. For example, in the case where the driver crosses his legs, the driver state recognition unit 15 recognizes that the posture of the driver is not an appropriate posture to the driving operation. In the case where the driver holds a portable information terminal in his hand, the driver state recognition unit 15 may recognize that the posture of the driver is not an appropriate posture to the driving operation.

Further, the driver state recognition unit 15 may determine a driver type of the driver. The driver type, for example, includes a driver type that likes a fast running (for example, a sporty type), and an ordinary driver type (for example, a normal type). For example, in the driver type that likes a fast running, as a driving tendency of the driver, the frequency of the lane change for passing is high when the driver performs the driving operation of the vehicle M. The driver state recognition unit 15, for example, determines the driver type of the driver based on a past driving history for the driver. The driver state recognition unit 15 may determine the driver type of the driver, based on the setting that is input by the driver in advance. Here, the ECU 10 does not always need to include the driver state recognition unit 15.

Figure 3:
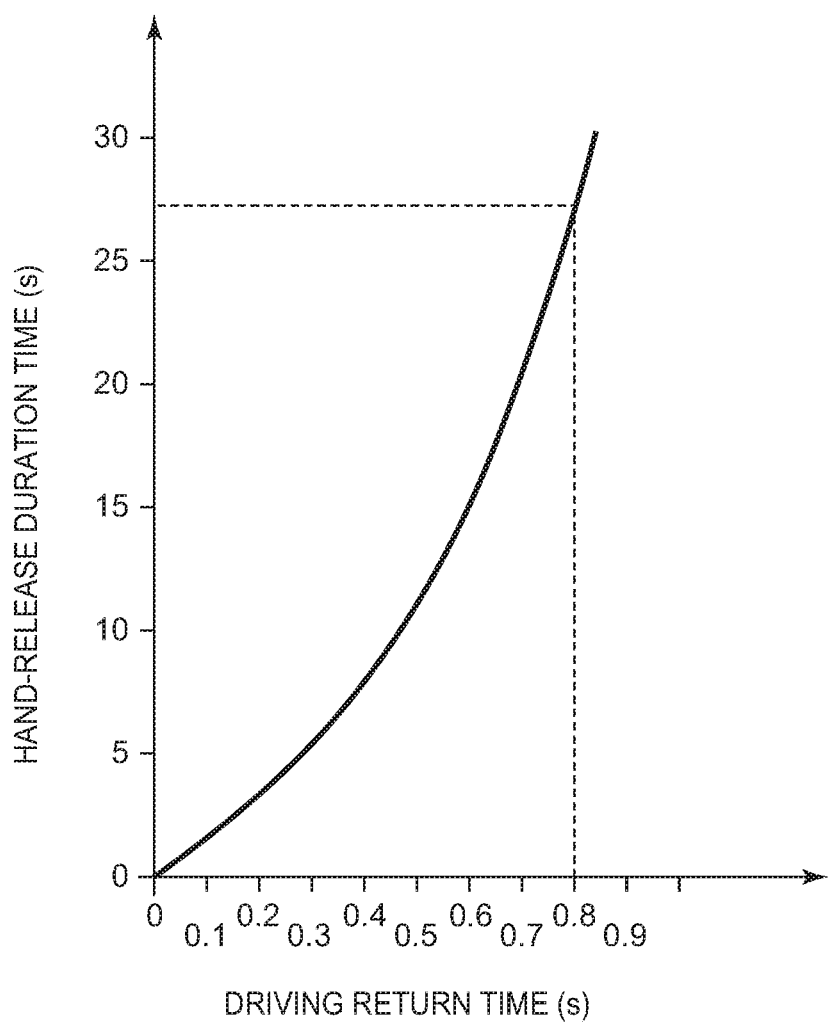
FIG. 3 is a graph specifying a relationship between a hand-release duration time and a driving return time.

The driving return time estimation unit 16 estimates the driving return time, based on the hand-release duration time measured by the hand-release duration time measurement unit 14. The driving return time estimation unit 16, for example, estimates the driving return time from the hand-release duration time, using map data or a numerical formula that is previously stored. Here, FIG. 3 is a graph specifying a relationship between the hand-release duration time and the driving return time. In FIG. 3, the ordinate indicates the hand-release duration time (unit: second), and the abscissa indicates the driving return time (unit: second). The driving return time estimation unit 16, for example, uses the relationship of the graph shown in FIG. 3 as the map data, and thereby, estimates the driving return time from the hand-release duration time. In FIG. 3, as an example, in the case where the hand-release duration time is 27 seconds, the driving return time can be evaluated as 0.8 seconds.

The driving return time estimation unit 16 may estimate the driving return time, using the recognition result of the driver state recognition unit 15, in addition to the hand-release duration time. For example, in the case where the driver is recognized to be in the low awake state by the driver state recognition unit 15, the driving return time estimation unit 16 estimates the driving return time to be longer than in the case where the driver is recognized to be not in the low awake state. The driving return time estimation unit 16 may adopt a mode of adding a previously set delay time to the driving return time in the case where the driver is recognized to be in the low awake state.

Similarly, for example, in the case where the driver is recognized to be in the look-away state by the driver state recognition unit 15, the driving return time estimation unit 16 estimates the driving return time to be longer than in the case where the driver is recognized to be not in the look-away state. The driving return time estimation unit 16 may adopt a mode of adding a previously set delay time to the driving return time in the case where the driver is recognized to be in the look-away state.

Further, in the case where the posture of the driver is determined to be not an appropriate posture to the driving operation by the driver state recognition unit 15, the driving return time estimation unit 16 may estimate the driving return time to be longer than in the case where the posture of the driver is determined to be an appropriate posture to the driving operation. The driving return time estimation unit 16 may adopt a mode of adding a previously set delay time to the driving return time in the case where the posture of the driver is determined to be not an appropriate posture to the driving operation.

Further, in the case where the driver type of the driver is determined by the driver state recognition unit 15, the driving return time estimation unit 16 may estimate the driving return time in consideration of the driver type. The driving return time estimation unit 16, for example, uses different kinds of map data between the case where the driver is the driver type that likes a fast running and the case where the driver is the ordinary driver type. For example, in the case where the driver is the ordinary driver type, the driving return time estimation unit 16 can use, for example, the map data corresponding to FIG. 3. On the other hand, for example, in the case where the driver is the driver type that likes a fast running, the driving return time estimation unit 16 can use the map data that is lower than the map data corresponding to FIG. 3 in the increase rate of the driving return time relative to the hand-release duration time, because it seems that the driver returns to the driving operation at a quicker speed in response to the alarm.

Here, the driving return time estimation unit 16 may alter the map data depending on the frequency of the hand-release state of the driver. For example, in the case where the driver repeats the hand-release state at a frequency of a certain number of times or more in a unit period, the driving return time estimation unit 16 can use the map data that is higher in the increase rate of the driving return time relative to the hand-release duration time, compared to the case where the driver does not repeat the hand-release state at the frequency of the certain number of times or more in the unit period.

The control unit 17 determines whether the difference between the departure margin time computed by the departure margin time computation unit 13 and the driving return time estimated by the driving return time estimation unit 16 is the first threshold or less. In the case of determining that the difference resulting from subtracting the driving return time from the departure margin time is the first threshold or less, the control unit 17 outputs the alarm to the driver. The control unit 17, for example, sends a control signal to the HMI 7, and thereby, outputs an alarm by the image display of the display unit 7a and an alarm by the voice output of the voice output unit 7b. The alarms, for example, are the image display and voice output having a content that prompts the driver to hold the steering wheel. Here, the alarm may be either one of the image display and the voice output. In the case of recognizing that the driver is operating a portable information terminal, the control unit 17 may output the alarm through the portable information terminal.

Here, the control unit 17 may output the alarm multiple times. The control unit 17 may set multiple thresholds that are less than the first threshold, and may output the alarm whenever the difference resulting from subtracting the driving return time from the departure margin time becomes equal to or less than any one of the thresholds.

Further, the control unit 17 determines whether the difference resulting from subtracting the driving return time from the departure margin time is the second threshold or less. In the case of determining that the difference resulting from subtracting the driving return time from the departure margin time is the second threshold or less, the control unit 17 executes the extension control of the departure margin time by at least one of the deceleration of the vehicle M and the restriction of the steering control range. The control unit 17 executes the extension control of the departure margin time, for example, by sending a control signal to the actuator 6. Here, the control unit 17, for example, may execute the extension control of the departure margin time by the restriction of the steering control range, only in the case of determining that the steering of the vehicle M is necessary because the vehicle M departs from the running lane R1 in the minimum time. Further, the control unit 17 may decide the execution content of the extension control of the departure margin time, based on the road shape of the running lane R1. That is, in the case of determining that the road shape of the running lane R1 along which the vehicle M is running or the running lane R1 in front of the vehicle M is a curve based on the map information and the like, the control unit 17 may execute the extension control of the departure margin time not by the restriction of the steering control range but by the deceleration of the vehicle M, in order to avoid the restriction of the steering control range from interfering with the curve running of the vehicle M.

The control unit 17 may execute the extension control of the departure margin time, simultaneously with the output of the alarm described above. In this case, as the second threshold and the first threshold, the same value can be adopted. Alternatively, as the second threshold, a value less than the first threshold may be adopted, and the control unit 17 may execute the extension control of the departure margin time, in the case where the driver continues the hand-release state even after the alarm. As the second threshold, a value greater than the first threshold may be adopted, and the control unit 17 may execute the extension control of the departure margin time before the alarm. In this case, for example, after executing the extension control of the departure margin time once, the control unit 17 does not perform the extension control of the departure margin time, even when the above difference becomes the second threshold or less again. Alternatively, the control unit 17 may execute the extension control of the departure margin time multiple times. In this case, the control unit 17 may output the alarm whenever executing the extension control of the departure margin time. The control unit 17 may repeat the extension control of the departure margin time until the number of times reaches a previously set number (for example, twice), or may repeat the extension control of the departure margin time until the speed of the vehicle M becomes a previously set speed (for example, 40 km/h) or less. Finally, in the case of determining that the difference resulting from subtracting the driving return time from the departure margin time is the first threshold or less, the control unit 17 outputs the alarm to the driver.

Here, in the case of determining that the difference resulting from subtracting the driving return time from the departure margin time is the first threshold or less, the control unit 17 does not need to output the alarm immediately, and may output the alarm after the elapse of a certain time. Further, in the case of determining that the difference resulting from subtracting the driving return time from the departure margin time is the first threshold or less, the control unit 17 may execute the extension control of the departure margin time first, and may output the alarm in time with the completion of the extension control of the departure margin time. Here, the control unit 17 does not always need to perform the extension control of the departure margin time.

The control unit 17 may alter the first threshold. The control unit 17, for example, alters the first threshold depending on the vehicle speed of the vehicle M. The control unit 17 may set the first threshold to a greater value as the vehicle speed of the vehicle M increases. Further, the control unit 17 alters the first threshold depending on the acceleration of the vehicle M. The control unit 17 may set the first threshold to a greater value as the acceleration of the vehicle M increases. The control unit 17 may alter the first threshold depending on the road shape. For example, in the case where the shape of a road along which the vehicle M is running is a curve shape, the control unit 17 sets a greater value, compared to the case where the road shape is a straight shape.

Further, the control unit 17 may alter the first threshold, based on the recognition result of the driver state recognition unit 15. For example, in the case where the driver is recognized to be in the low awake state by the driver state recognition unit 15, the control unit 17 sets the first threshold to a greater value, compared to the case where the driver is recognized to be not in the low awake state. Similarly, for example, in the case where the driver is recognized to be in the look-away state by the driver state recognition unit 15, the control unit 17 sets the first threshold to a greater value, compared to the case where the driver is recognized to be not in the look-away state. The control unit 17 may perform the above-described alterations of the threshold, for the second threshold.

In the case where the driver continues the hand-release state even after the output of the alarm, the control unit 17 may cancel the vehicle control for the LTC or the automatic driving. For example, in the case where the difference resulting from subtracting the driving return time from the departure margin time is a fourth threshold or less, the control unit 17 cancels the vehicle control for the LTC or the automatic driving, and stops the vehicle M at a road shoulder. The fourth threshold is a value that is less than the first threshold and the second threshold. Here, in the comparison between negative values, a value that is greater in absolute value is smaller as the threshold.

Control Method by Vehicle Control Apparatus According to First Embodiment

Figure 4:
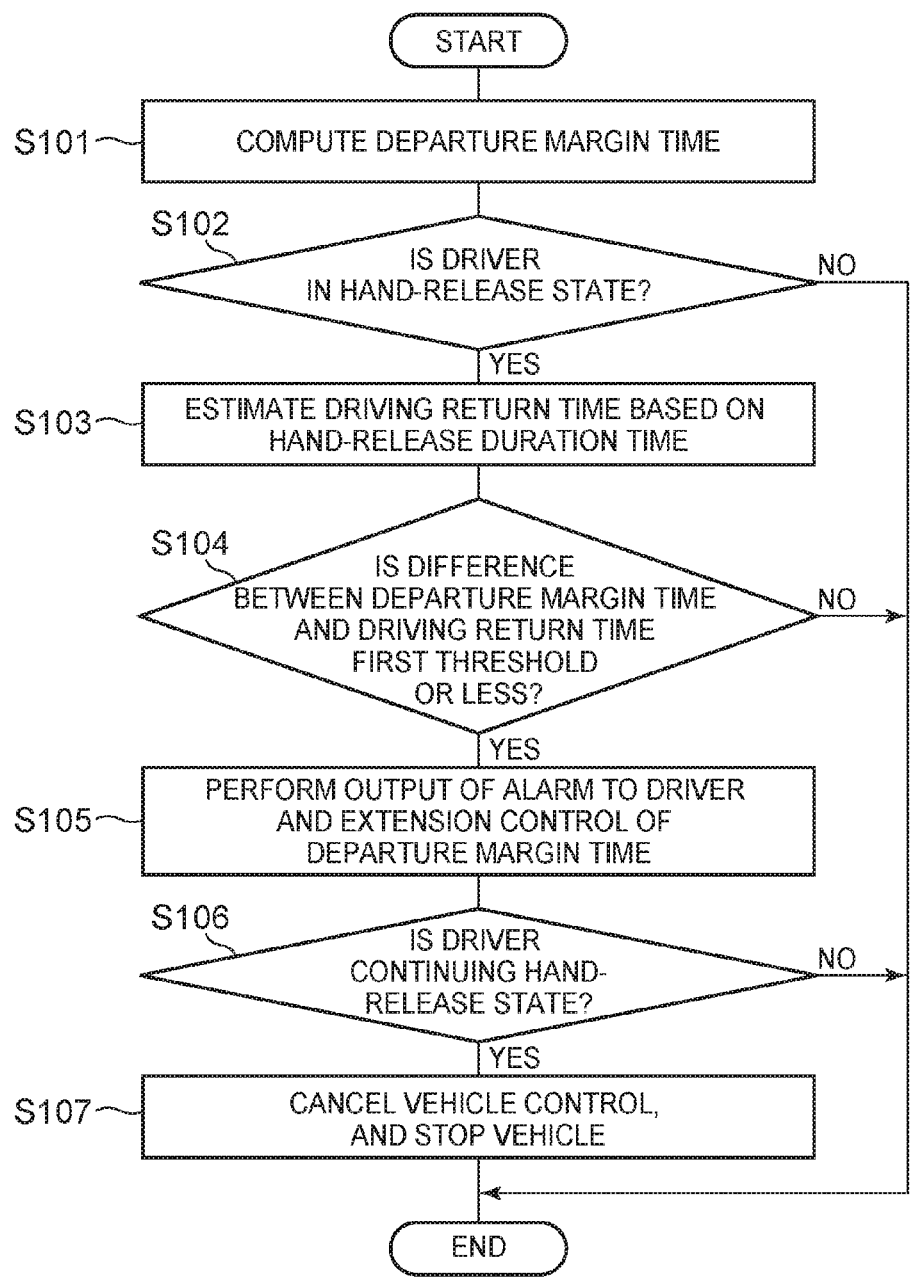
FIG. 4 is a flowchart showing a control method by the vehicle control apparatus according to the first exemplary embodiment.

In the following, a control method by the vehicle control apparatus 100 according to the first embodiment will be described with reference to FIG. 4. FIG. 4 is a flowchart showing a control method by the vehicle control apparatus 100 according to the first embodiment. The flowchart shown in FIG. 4, for example, is executed repeatedly at a previously set interval, in the case where the vehicle M is controlled such that the vehicle M runs along the running lane R1.

As shown in FIG. 4, in step S101, the ECU 10 performs the computation of the departure margin time by the departure margin time computation unit 13. The departure margin time computation unit 13 computes the departure margin time, which is the time (for example, the minimum time) until the vehicle M departs from the running lane in the steering control range and the vehicle speed control range. The departure margin time computation unit 13 computes the departure margin time, for example, based on the running state of the vehicle M and the lateral position and orientation of the vehicle M relative to the running lane R1. After computing the departure margin time, the ECU 10 transitions to step S102.

In step S102, the ECU 10 determines whether the driver is in the hand-release state by the hand-release duration time measurement unit 14. The hand-release duration time measurement unit 14, for example, determines whether the driver is in the hand-release state, based on the detection result of the steering touch sensor. In the case of determining that the driver is not in the hand-release state (S102: NO), the ECU 10 finishes the process this time. Thereafter, the process is repeated again from step S101, after the elapse of a previously set time. In the case of determining that the driver is in the hand-release state (S102: YES), the ECU 10 starts the measurement of the hand-release duration time by the hand-release duration time measurement unit 14, and transitions to step S103. Here, in the case where the measurement of the hand-release duration time has already been started, the hand-release duration time measurement unit 14 does not start the measurement of the hand-release duration time newly, and continues the current measurement of the hand-release duration time.

In step S103, the ECU 10 performs the estimation of the driving return time by the driving return time estimation unit 16. The driving return time estimation unit 16, for example, estimates the driving return time from the hand-release duration time, using map data or a numerical formula that is previously stored. The driving return time estimation unit 16 may estimate the driving return time, using the recognition result of the driver state recognition unit 15, in addition to the hand-release duration time. For example, in the case where the driver is recognized to be in the low awake state by the driver state recognition unit 15, the driving return time estimation unit 16 estimates the driving return time to be a longer time, compared to the case where the driver is recognized to be not in the low awake state. Similarly, for example, in the case where the driver is recognized to be in the look-away state by the driver state recognition unit 15, the driving return time estimation unit 16 estimates the driving return time to be a longer time, compared to the case where the driver is recognized to be not in the look-away state.

Further, in the case where the driver type of the driver is determined by the driver state recognition unit 15, the driving return time estimation unit 16 may estimate the driving return time in consideration of the driver type. The driving return time estimation unit 16, for example, estimates the driving return time, using different kinds of map data between the case where the driver is the driver type that likes a fast running and the case where the driver is the ordinary driver type. After the driving return time estimation unit 16 estimates the driving return time, the ECU 10 transitions to step S104.

In step S104, the ECU 10 determines whether the difference resulting from subtracting the driving return time from the departure margin time is the first threshold or less, by the control unit 17. Here, the control unit 17 may alter the first threshold. For example, the control unit 17 increases the first threshold as the vehicle speed of the vehicle M increases, and thereby, advances the timing of the alarm output. Increasing the first threshold is equivalent to shortening the departure margin time by the weighting of the departure margin time. In the case of determining that the difference resulting from subtracting the driving return time from the departure margin time is greater than the first threshold (step S104: NO), the ECU 10 finishes the process this time. Thereafter, the process is repeated again from step S101, after the elapse of the previously set time. In the case of determining that the difference resulting from subtracting the driving return time from the departure margin time is the first threshold or less (step S104: YES), the ECU 10 transitions to step S105.

In step S105, the ECU 10 performs the output of the alarm by the control unit 17. The control unit 17, for example, sends a control signal to the HMI 7, and thereby, outputs the alarm by the image display of the display unit 7a and the alarm by the voice output of the voice output unit 7b. Further, simultaneously with the output of the alarm, the control unit 17 executes the extension control of the departure margin time by at least one of the deceleration of the vehicle M and the restriction of the steering control range. The case of simultaneously performing the output of the alarm and the extension control of the departure margin time in this way is the case where the first threshold relevant to the alarm output and the second threshold relevant to the extension control of the departure margin time are the same value, for example. Here, the control unit 17 may set different values as the first threshold and the second threshold, and may provide a time lag between the alarm output and the extension control of the departure margin time. Here, it is not always necessary to perform the extension control of the departure margin time. After executing the output of the alarm and the extension control of the departure margin time, the ECU 10 transitions to step S106. The ECU 10 may transition to step S106, after the elapse of a previously set time from the execution of the output of the alarm and the execution of the extension control of the departure margin time. Here, the ECU 10 does not always need to perform the extension control of the departure margin time.

In step S106, again, the ECU 10 determines whether the driver is continuing the hand-release state, by the hand-release duration time measurement unit 14. In the case of determining that the driver is not continuing the hand-release state (S106: NO), the ECU 10 finishes the process this time. Thereafter, the process is repeated again from step S101, after the elapse of a previously set time. In the case of determining that the driver is continuing the hand-release state (S106: YES), the ECU 10 transitions to step S107.

In step S107, the ECU 10 cancels the vehicle control for the LTC or the automatic driving by the control unit 17, and stops the vehicle M at a road shoulder. The control unit 17 sends a control signal to the actuator 6, and thereby, stops the vehicle M at a road shoulder of the running lane R1.

Here, the ECU 10 may cancel the vehicle control of the LTC or the automatic driving and stop the vehicle M at a road shoulder, in case where the difference resulting from subtracting the driving return time from the departure margin time is the fourth threshold or less, instead of steps S106 and S107. The fourth threshold is a value that is less than the first threshold. Further, it is not always necessary to perform steps S106 and S107. Further, the ECU 10 may execute step S102 before step S101, and may execute step S102 and step S103 before step S101. In this case, the ECU 10 computes the departure margin time, in the case of determining that the driver is in the hand-release state.

In addition, during the measurement of the hand-release duration time, the hand-release duration time measurement unit 14 repeats the determination of whether the driver is in the hand-release state, at a previously set interval, separately from the flowchart shown in FIG. 4. In the case of determining that the driver is not in the hand-release state, the hand-release duration time measurement unit 14 completes the measurement of the hand-release duration time. In the case where the hand-release duration time measurement unit 14 during the measurement of the hand-release duration time determines that the driver is not in the hand-release state, the ECU 10 finishes the process of the flowchart shown in FIG. 4. In the case of determining that the driver is not in the hand-release state, the ECU 10 finishes the process of the flowchart shown in FIG. 4, even during the output of the alarm and the extension control of the departure margin time. Then, the ECU 10 stops the output of the alarm and the extension control of the departure margin time, and returns to an ordinary vehicle control. Thereafter, the ECU 10 repeats the process again from step S101, after the elapse of a previously set time.

In the vehicle control apparatus 100 according to the first exemplary embodiment described above, in consideration of the case where an abnormality such as a false recognition occurs in the apparatus, the alarm is output to the driver, in the case where the difference resulting from subtracting the driving return time for the driver from the departure margin time, which is the time until the vehicle M departs from the running lane R1 in the steering control range and vehicle speed control range that can be controlled by the apparatus, is the first threshold or less. Therefore, according to the vehicle control apparatus 100, it is possible to output the alarm at a timing that is scheduled in terms of the departure of the vehicle M from the running lane R1, and to prevent the alarm from giving the driver a feeling of strangeness, compared to the related apparatus that outputs the alarm in a given time in the case where the driver is in the hand-release state.

Further, in the case where the difference resulting from subtracting the driving return time from the departure margin time is the second threshold or less, the vehicle control apparatus 100 may execute the extension control of the departure margin time by at least one of the deceleration of the vehicle M and the restriction of the steering control range. In this case, since the vehicle control apparatus 100 executes the extension control of the departure margin time in the case where the difference resulting from subtracting the driving return time from the departure margin time is the second threshold or less, it is possible to secure the time for the driver to return to the driving operation before the vehicle M departs from the running lane, even when an abnormality such as a false recognition occurs in the apparatus while the driver continues the hand-release state for example.

Furthermore, in the case where the driver is recognized to be in the low awake state, the vehicle control apparatus 100 may estimate the driving return time to be a longer time, compared to the case where the driver is recognized to be not in the low awake state. In this case, since the time to return to the driving operation in response to the alarm is long in the case where the driver is in the low awake state, the vehicle control apparatus 100 estimates the driving return time to be a longer time, in the case where the driver is recognized to be in the low awake state. Thereby, it is possible to estimate the driving return time corresponding to the state of the driver.

Figure 5:
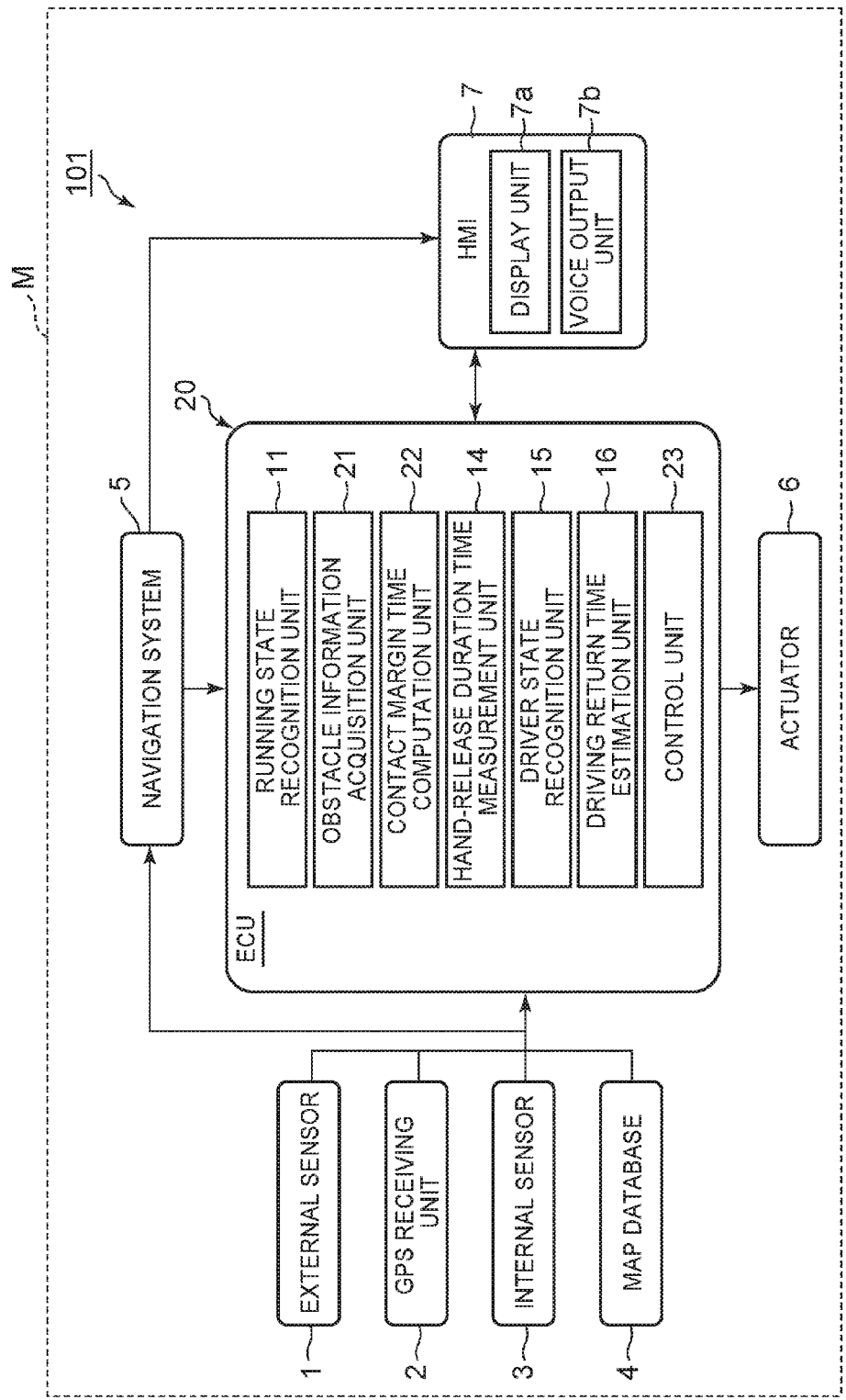
FIG. 5 is a block diagram showing a vehicle control apparatus according to a second exemplary embodiment.

Next, a vehicle control apparatus 101 according to a second exemplary embodiment will be described. FIG. 5 is a block diagram showing the vehicle control apparatus 101 according to the second embodiment. As shown in FIG. 5, the vehicle control apparatus 101 according to the second embodiment is different from the vehicle control apparatus 100 according to the first embodiment, in that a contact margin time is used instead of the departure margin time.

The contact margin time is a time (for example, the minimum time) until the vehicle M comes into contact with an obstacle around the vehicle M in a steering control range and a vehicle speed control range that are previously set. For example, the obstacle is a structure such as a wall or a building, another vehicle (a leading vehicle, another vehicle running side by side, a two-wheel vehicle, a bicycle or the like), or a pedestrian. The contact between the vehicle M and the obstacle may include a case where the distance between the vehicle M and the obstacle becomes equal to or less than a previously set contact distance, in addition to a case where the vehicle M and the obstacle actually come into contact with each other. The previously set contact distance may be a fixed value (for example, 0.5 m), or may be a variable value.

For example, if an abnormality such as a false recognition of a surrounding situation occurs in the vehicle control apparatus 101 and the vehicle control apparatus 101 controls the vehicle M such that the vehicle M goes toward an obstacle in the steering control range and the vehicle speed control range, the contact margin time corresponds to the minimum time until the vehicle M comes into contact with the obstacle. The contact margin time may be the minimum time until the vehicle M comes into contact with the obstacle by the control of the steering from the vehicle control apparatus 101 while the current vehicle speed is maintained. The minimum time herein is not the minimum time until the vehicle M comes into contact with the obstacle actually, but the computed minimum time until the vehicle comes into contact with the obstacle hypothetically. The minimum time varies depending on computation technique or the setting of parameters to be used for the computation.

Figure 6:
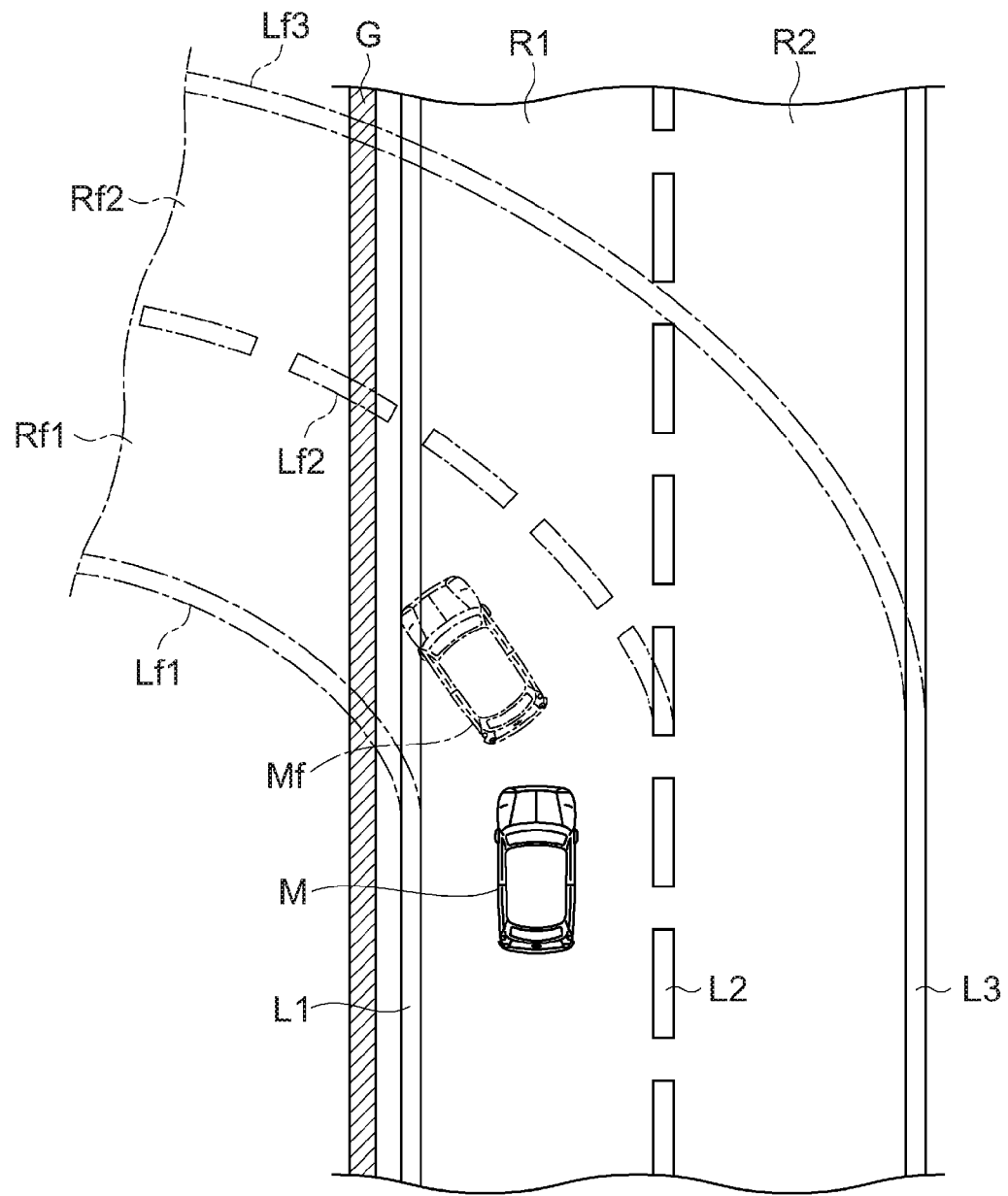
FIG. 6 is a plan view for describing a contact margin time.

Here, FIG. 6 is a plan view for describing the contact margin time. FIG. 6 is different from FIG. 2 only in that there is a wall G as the obstacle. FIG. 6 shows a situation in which the wall G cannot be recognized due to an abnormality of the radar or the like, and by a false recognition of white lines, the vehicle control apparatus 101 controls the vehicle M such that the vehicle M goes toward the wall G. In this case, the vehicle control apparatus 101, for example, computes the contact margin time that is the minimum time until the vehicle M comes into contact with the wall G in the steering control range and the vehicle speed control range.

Figure 7:
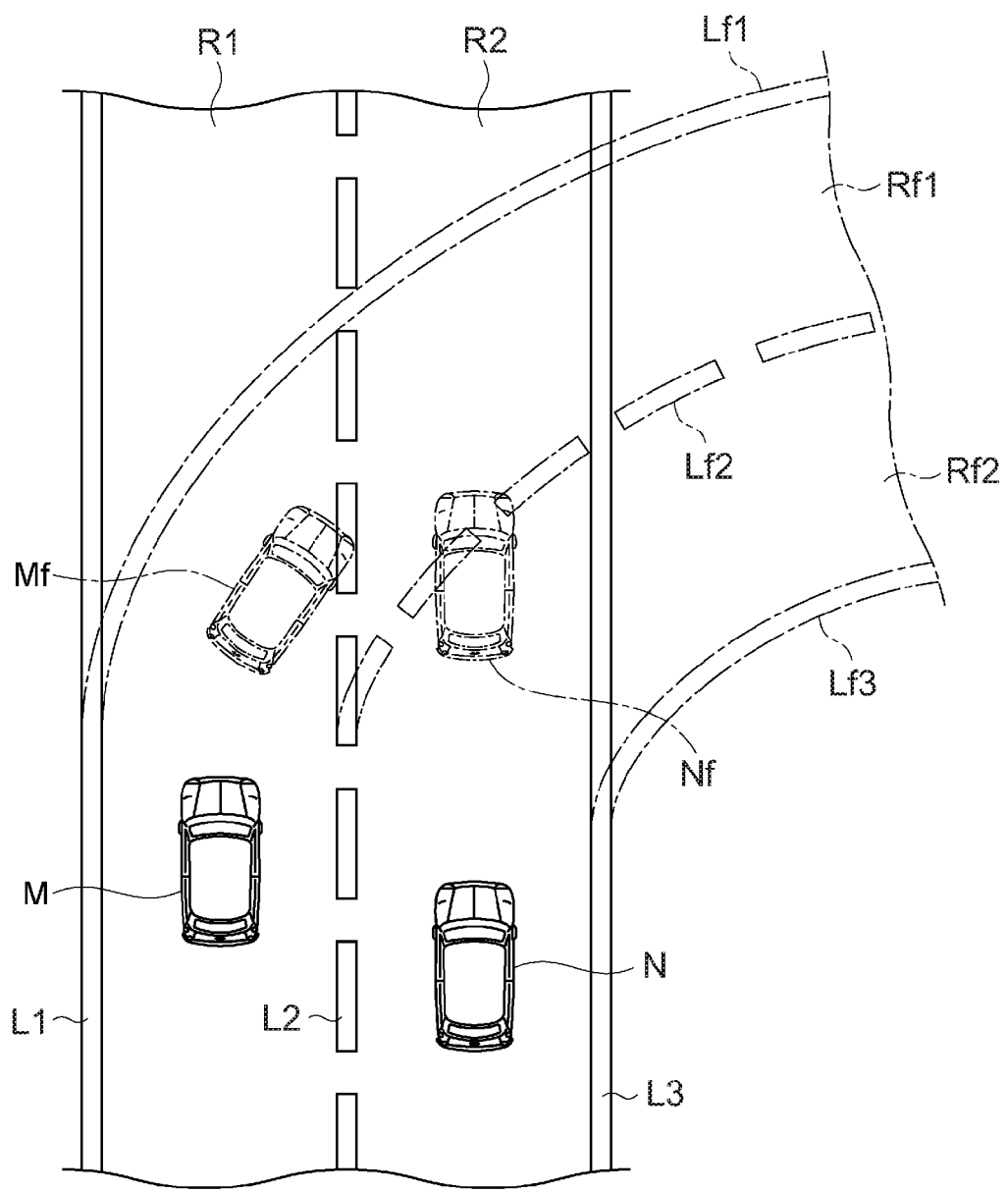
FIG. 7 is a plan view for describing another example of the contact margin time.

FIG. 7 is a plan view for describing another example of the contact margin time. FIG. 7 shows another vehicle N that runs along the adjacent lane R2, a future position Nf of the other vehicle N that will go straight along the adjacent lane R2, and a position Mf of the vehicle M in the case of running along the running lane Rf1. In FIG. 7, although the actual running lane R1 and the adjacent lane R2 are straight roads, the vehicle control apparatus 101 falsely recognizes the running lane Rf1 and adjacent lane Rf2 that are right-hand curves. Further, FIG. 7 shows a situation in which the other vehicle N cannot be recognized due to an abnormality of the radar or the like, and by a false recognition of white lines by the vehicle control apparatus 101, the vehicle control apparatus 101 controls the vehicle M such that the vehicle M goes toward the future position Nf of the other vehicle N. In this case, the vehicle control apparatus 101, for example, computes the contact margin time that is the minimum time until the vehicle M comes into contact with the other vehicle N in the steering control range and the vehicle speed control range.

Here, the vehicle control apparatus 101 may predict the course of the other vehicle N for computing the contact margin time, but does not have to predict the course of the other vehicle N. In the case where the course information about the other vehicle N can be acquired by the utilization of inter-vehicle communication or the like, the vehicle control apparatus 101 may compute the contact margin time using the course information about the other vehicle N. Further, the vehicle control apparatus 101 may determine whether there is a possibility that the vehicle M comes into contact with the other vehicle N by the control that the vehicle control apparatus 101 performs in the steering control range and the vehicle speed control range. The vehicle control apparatus 101, for example, computes the contact margin time in the case of determining that there is a possibility that the vehicle M comes into contact with the other vehicle N, and does not compute the contact margin time in the case of determining that there is no possibility that the vehicle M comes into contact with the other vehicle N. In addition, the vehicle control apparatus 101 may compute the contact margin time, by regarding the other vehicle N as a wall that extends along the adjacent lane R2, without predicting the course of the other vehicle N.

In addition, the vehicle control apparatus 101 may compute the contact margin time to the number of obstacles that are present around the vehicle M. In this case, for example, the vehicle control apparatus 101 outputs the alarm using only the shortest contact margin time, in order to avoid the driver from being irritated by the repetition of the alarm.

In the case of determining that the driver is in the hand-release state after the computation of the contact margin time, the vehicle control apparatus 101 determines whether the difference between the hand-release duration time and the contact margin time is a third threshold or less. The third threshold is a threshold that is set for outputting the alarm to the driver in the hand-release state at a proper timing. The third threshold may be a fixed value, or may be a variable value. The third threshold may be zero, or may be a negative value. As the third threshold, for example, a greater value may be adopted as the vehicle speed of the vehicle M or the acceleration of the vehicle M increases. For example, in the case where the shape of a road along which the vehicle M is running is a curve shape, a greater value may be adopted as the third threshold, compared to the case where the road shape is a straight shape. By adopting a greater value as the third threshold, it is possible to advance the timing of the alarm. Increasing the third threshold is equivalent to shortening the contact margin time by the weighting of the contact margin time.

Further, similarly to the first embodiment, in the case of determining that the difference resulting from subtracting the driving return time from the contact margin time is the second threshold or less, the vehicle control apparatus 101 may perform the extension control of the contact margin time by at least one of the deceleration of the vehicle M and the restriction of the steering control range. The second threshold may be the same value as the third threshold. The second threshold may be a value greater than the third threshold, or may be a value less than the third threshold.

In the following, a configuration of the vehicle control apparatus 101 according to the second exemplary embodiment will be described with reference to FIG. 5 again. For elements identical or corresponding to those in the first embodiment, identical reference characters are assigned, and the descriptions are omitted.

As shown in FIG. 5, an ECU 20 of the vehicle control apparatus 101 is different from that in the first embodiment, in that an obstacle information acquisition unit 21 is included instead of the lateral position recognition unit 12 and in that a contact margin time computation unit 22 is included instead of the departure margin time computation unit 13. The units of the ECU 20 may comprise circuitry configured to perform the respective functions of the units, one or more processors configured to perform the respective functions, etc.

The obstacle information acquisition unit 21, for example, acquires the obstacle information relevant to an obstacle around the vehicle M, based on the detection result of the external sensor 1. The obstacle information acquisition unit 21, for example, acquires the obstacle information from the radar. The obstacle information, for example, includes the information relevant to the position of the obstacle and the size of the obstacle. The obstacle information may include the information relevant to the kind of the obstacle (the kind of a structure, another vehicle, a pedestrian or the like). In this case, for example, the obstacle information acquisition unit 21 can acquire the information relevant to the kind of the obstacle, based on the imaging information of the camera, by a well-known technique.

In addition, the obstacle information acquisition unit 21 may acquire the obstacle information, through wireless communication, from a computer in a facility such as an information processing center or another vehicle capable of inter-vehicle communication. The obstacle information acquisition unit 21 may acquire the information relevant to the hardness of the obstacle, using a well-known optical analysis technique that utilizes a spectrum sensor. Based on the obstacle information, the obstacle information acquisition unit 21 determines whether there is an obstacle around the vehicle M.

The contact margin time computation unit 22, for example, computes the contact margin time, which is the time until the vehicle M comes into contact with the obstacle around the vehicle M in the steering control range and the vehicle speed control range, based on the running state of the vehicle M and the obstacle information. The contact margin time computation unit 22, for example, computes the contact margin time, by combining well-known techniques (an optimization technique and the like). Here, in the case where the steering control range and the vehicle speed control range vary depending on the situation, the contact margin time computation unit 22 computes the contact margin time with reference to the current steering control range and vehicle speed control range.

A control unit 23, which also may be included in the ECU 20, determines whether the difference between the contact margin time computed by the contact margin time computation unit 22 and the driving return time estimated by the driving return time estimation unit 16 is the third threshold or less. In the case of determining that the difference resulting from subtracting the driving return time from the contact margin time is the third threshold or less, the control unit 23 outputs the alarm to the driver. The control unit 23, for example, sends a control signal to the HMI 7, and thereby, outputs the alarm by the image display of the display unit 7a and the alarm by the voice output of the voice output unit 7b. The alarms, for example, are the image display and voice output having a content that prompts the driver to hold the steering wheel. Here, the alarm may be either one of the image display and the voice output.

Further, the control unit 23, for example, determines whether the difference resulting from subtracting the driving return time from the contact margin time is the second threshold or less. In the case of determining that the difference resulting from subtracting the driving return time from the contact margin time is the second threshold or less, the control unit 23 executes the extension control of the contact margin time by at least one of the deceleration of the vehicle M and the restriction of the steering control range. The control unit 23 may execute the extension control of the contact margin time by both of the deceleration of the vehicle M and the restriction of the steering control range.

Here, the control unit 23 may execute the extension control of the contact margin time, simultaneously with the output of the alarm described above. The control unit 23 may execute the extension control of the contact margin time after the output of the alarm, or may execute the extension control of the contact margin time before the output of the alarm. The control unit 23 does not always need to perform the extension control of the contact margin time.

The control unit 23 may alter the third threshold. The control unit 23, for example, alters the third threshold depending on the vehicle speed of the vehicle M. The control unit 23 may set the third threshold to a greater value as the vehicle speed of the vehicle M increases. Further, the control unit 23, for example, alters the third threshold depending on the acceleration of the vehicle M. The control unit 23 may set the third threshold to a greater value as the acceleration of the vehicle M increases. The control unit 23 may alter the third threshold depending on the road shape. For example, in the case where the shape of a road along which the vehicle M is running is a curve shape, the control unit 23 sets a greater value, compared to the case where the road shape is a straight shape.

Further, the control unit 23 may alter the third threshold, based on the recognition result of the driver state recognition unit 15. For example, in the case where the driver is recognized to be in the low awake state by the driver state recognition unit 15, the control unit 23 sets the third threshold to a greater value, compared to the case where the driver is recognized to be not in the low awake state. Similarly, for example, in the case where the driver is recognized to be in the look-away state by the driver state recognition unit 15, the control unit 23 sets the third threshold to a greater value, compared to the case where the driver is recognized to be not in the look-away state.

Further, the control unit 23 may alter the third threshold, based on the running state of the vehicle M and the obstacle information. For example, from the running state of the vehicle M and the obstacle information, the control unit 23 alters the third threshold, depending on the contact angle (so-called collision angle) when the vehicle M comes into contact with the obstacle. The control unit 23, for example, defines the front of the vehicle M as zero, and sets the third threshold to a greater value as the contact angle relative to the obstacle increases. The control unit 23, for example, alters the third threshold depending on the kind of the obstacle. In the case where the obstacle is a pedestrian, the control unit 23 may increase the third threshold, compared to the case where the obstacle is a structure. In the case where the obstacle is another vehicle, the control unit 23 may increase the third threshold, compared to the case where the obstacle is a structure. The control unit 23 may alter the third threshold depending on the hardness of the obstacle. The control unit 23, for example, increases the third threshold as the hardness of the obstacle increases. The control unit 23 may perform the above-described alterations of the threshold, for the second threshold.

Figure 8:
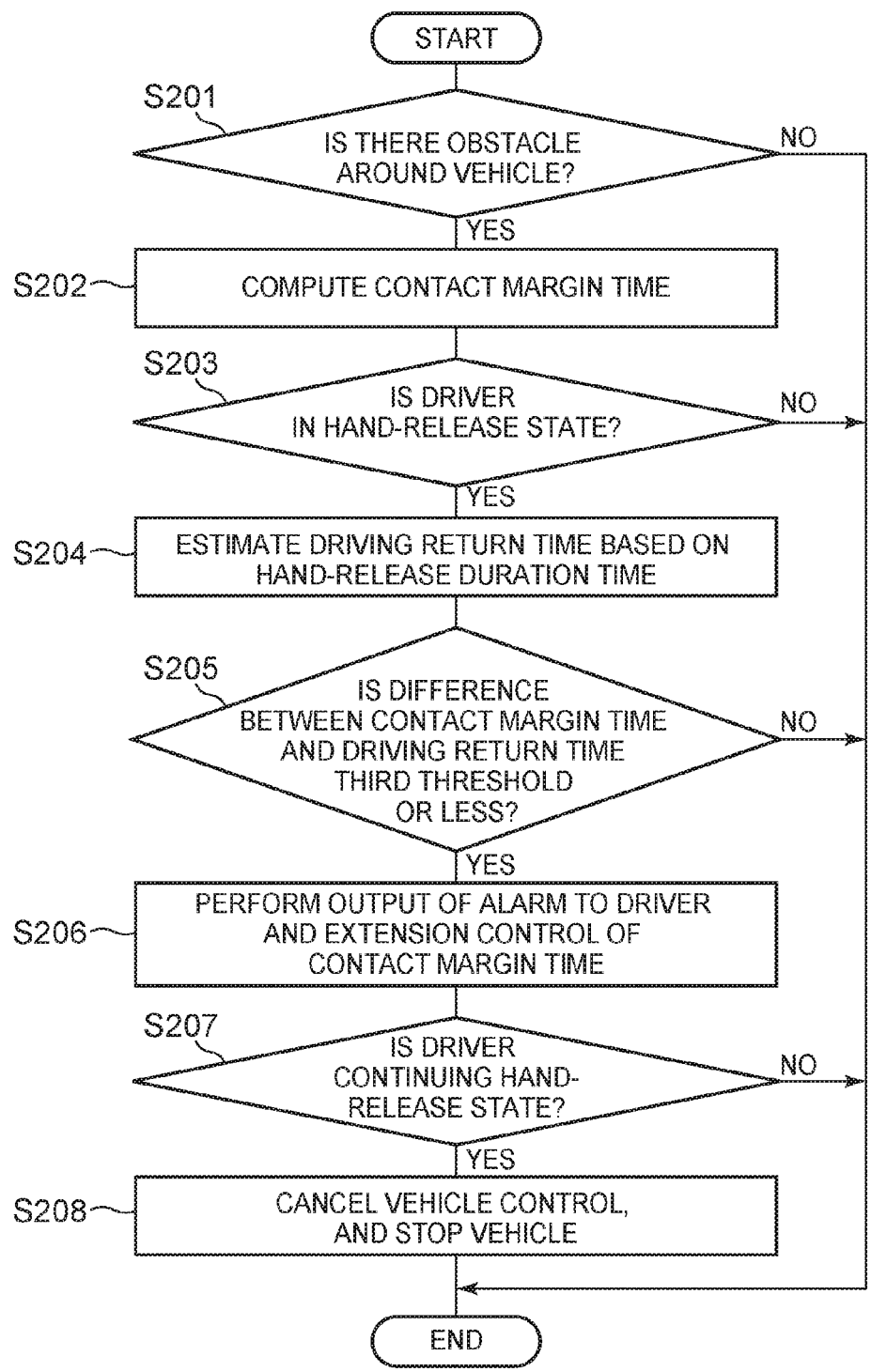
FIG. 8 is a flowchart showing a control method by the vehicle control apparatus according to the second exemplary embodiment.

In the following, a control method by the vehicle control apparatus 101 according to the second embodiment will described with reference to FIG. 8. FIG. 8 is a flowchart showing a control method by the vehicle control apparatus 101 according to the second embodiment. The flowchart shown in FIG. 8, for example, is executed repeatedly at a previously set interval, in the case where the vehicle M is controlled such that the vehicle M runs along the running lane R1.

As shown in FIG. 8, in step S201, the ECU 20 of the vehicle control apparatus 101 according to the second embodiment determines whether there is an obstacle around the vehicle M by the obstacle information acquisition unit 21. The obstacle information acquisition unit 21, for example, determines whether there is an obstacle around the vehicle M, based on the obstacle information acquired from the radar. In the case of determining that there is no obstacle around the vehicle M (S201: NO), the ECU 20 finishes the process this time. Thereafter, the process is repeated again from step S201, after the elapse of a previously set time. In the case of determining that there is an obstacle around the vehicle M (S201: YES), the ECU 20 transitions to step S202.

In step S202, the ECU 20 performs the computation of the contact margin time by the contact margin time computation unit 22. The contact margin time computation unit 22 computes the contact margin time, which is the time (for example, the minimum time) until the vehicle M comes into contact with the obstacle in the steering control range and the vehicle speed control range. The contact margin time computation unit 22 computes the contact margin time, for example, based on the running state of the vehicle M recognized by the running state recognition unit 11 and the obstacle information acquired by the obstacle information acquisition unit 21. After computing the contact margin time, the ECU 20 transitions to step S203.

In step S203, the ECU 20 determines whether the driver is in the hand-release state by the hand-release duration time measurement unit 14. Step S203 is the same process as step S102 in FIG. 4. In the case of determining that the driver is not in the hand-release state (S203: NO), the ECU 20 finishes the process this time. Thereafter, the process is repeated again from step S201, after the elapse of a previously set time. In the case of determining that the driver is in the hand-release state (S203: YES), the ECU 20 starts the measurement of the hand-release duration time by the hand-release duration time measurement unit 14, and transitions to step S204. Here, in the case where the measurement of the hand-release duration time has already been started, the hand-release duration time measurement unit 14 does not start the measurement of the hand-release duration time newly, and continues the current measurement of the hand-release duration time.

In step S204, the ECU 20 performs the estimation of the driving return time by the driving return time estimation unit 16. Step S204 is the same process as step S103 in FIG. 4. After the driving return time estimation unit 16 estimates the driving return time, the ECU 20 transitions to step S205.

In step S205, the ECU 20 determines whether the difference resulting from subtracting the driving return time from the contact margin time is the third threshold or less, by the control unit 23. Here, the control unit 23 may alter the third threshold. In the case of determining that the difference resulting from subtracting the driving return time from the contact margin time is greater than the third threshold (step S205: NO), the ECU 20 finishes the process this time. Thereafter, the process is repeated again from step S201, after the elapse of the previously set time. In the case of determining that the difference resulting from subtracting the driving return time from the contact margin time is the third threshold or less (step S205: YES), the ECU 20 transitions to step S206.

In step S206, the ECU 20 performs the output of the alarm by the control unit 23. Further, simultaneously with the output of the alarm, the control unit 23 executes the extension control of the contact margin time by at least one of the deceleration of the vehicle M and the restriction of the steering control range. Step S206 is the same process as step S105 in FIG. 4. For example, after executing the output of the alarm and the extension control of the contact margin time, the ECU 20 transitions to step S207. Here, the ECU 20 does not always need to perform the extension control of the contact margin time.

In step S207, again, the ECU 20 determines whether the driver is in the hand-release state, by the hand-release duration time measurement unit 14. Step S207 is the same process as step S106 in FIG. 4. In the case of determining that the driver is not in the hand-release state (S207: NO), the ECU 20 finishes the process this time. Thereafter, the process is repeated again from step S201, after the elapse of a previously set time. In the case of determining that the driver is in the hand-release state (S207: YES), the ECU 20 transitions to step S208.

In step S208, the ECU 20 cancels the vehicle control for the LTC or the automatic driving by the control unit 23, and stops the vehicle M at a road shoulder. Step S208 is the same process as step S107 in FIG. 4. The control unit 23 sends a control signal to the actuator 6, and thereby, stops the vehicle M at a road shoulder of the running lane R1.

Here, the ECU 20 may cancel the vehicle control for the LCT or the automatic driving and stops the vehicle M at a road shoulder, in case where the difference resulting from subtracting the driving return time from the departure margin time is the fourth threshold or less, instead of steps S207 and S208. The fourth threshold is a value that is less than the third threshold. Further, it is not always necessary to perform steps S207 and S208. Further, the ECU 20 may execute step S203 before step S202, and may execute step S203 and step S204 before step S202. In this case, the ECU 20 computes the contact margin time, in the case of determining that the driver is in the hand-release state.

Further, during the measurement of the hand-release duration time, the hand-release duration time measurement unit 14 repeats the determination of whether the driver is in the hand-release state, at a previously set interval, separately from the flowchart shown in FIG. 8. In the case of determining that the driver is not in the hand-release state, the hand-release duration time measurement unit 14 completes the measurement of the hand-release duration time. In the case where the hand-release duration time measurement unit 14 during the measurement of the hand-release duration time determines that the driver is not in the hand-release state, the ECU 20 finishes the process of the flowchart shown in FIG. 8. In the case of determining that the driver is not in the hand-release state, the ECU 20 finishes the process of the flowchart shown in FIG. 8, even during the output of the alarm and the extension control of the departure margin time. Then, the ECU 20 stops the output of the alarm and the extension control of the departure margin time, and returns to an ordinary vehicle control. Thereafter, the ECU 20 repeats the process again from step S201, after the elapse of a previously set time.

In the vehicle control apparatus 101 according to the second embodiment described above, in consideration of the case where an abnormality such as a false recognition occurs in the apparatus, the alarm is output to the driver, in the case where the difference resulting from subtracting the driving return time for the driver from the contact margin time, which is the time until the vehicle M comes into contact with the obstacle in the steering control range and vehicle speed control range that can be controlled by the apparatus, is the third threshold or less. Therefore, according to the vehicle control apparatus 101, it is possible to output the alarm at a timing that is scheduled in terms of the contact of the vehicle M with the obstacle, and to prevent the alarm from giving the driver a feeling of strangeness, compared to the related apparatus that outputs the alarm in a given time in the case where the driver is in the hand-release state.

Further, in the case where the difference resulting from subtracting the driving return time from the contact margin time is the second threshold or less, the vehicle control apparatus 101 may execute the extension control of the contact margin time by at least one of the deceleration of the vehicle M and the restriction of the steering control range. In this case, since the vehicle control apparatus 101 executes the extension control of the contact margin time in the case where the difference resulting from subtracting the driving return time from the contact margin time is the second threshold or less, it is possible to secure the time for the driver to return to the driving operation before the vehicle M comes into contact with the obstacle, even when an abnormality such as a false recognition occurs in the apparatus while the driver continues the hand-release state for example.

Furthermore, in the case where the driver is recognized to be in the low awake state, the vehicle control apparatus 101 may estimate the driving return time to be a longer time, compared to the case where the driver is recognized to be not in the low awake state. In this case, since the time to return to the driving operation in response to the alarm is long in the case where the driver is in the low awake state, the vehicle control apparatus 101 estimates the driving return time to be a longer time, in the case where the driver is recognized to be in the low awake state. Thereby, it is possible to estimate the driving return time corresponding to the state of the driver.

Thus, preferable embodiments of the disclosure have been described, but the disclosure is not limited to the above-described embodiments. For example, constituents of the embodiments may be appropriately combined and used. Further, the disclosure can be carried out in a variety of modes in which various modifications and improvements are made based on the knowledge of a person skilled in the art, including the above-described embodiments.

For example, the vehicle control apparatus 100 according to the first exemplary embodiment may output the alarm in consideration of the contact margin time according to the second exemplary embodiment. Specifically, the vehicle control apparatus 100 according to the first embodiment may include the obstacle information acquisition unit 21 and contact margin time computation unit 22 according to the second embodiment, and may output the alarm to the driver in the case where the control unit 17 determines that the difference resulting from subtracting the driving return time from the contact margin time is the third threshold or less. Further, the vehicle control apparatus 100 may execute both of the flowchart shown in FIG. 4 and the flowchart shown in FIG. 8. The common steps can be executed at the same timing. Thereby, in the case where there is no obstacle around the vehicle M, the vehicle control apparatus 100 can output the alarm at a proper timing in consideration of the departure from the running lane R1, and in the case where there is an obstacle around the vehicle M, the vehicle control apparatus 100 can output the alarm at a proper timing in consideration of the contact with the obstacle.

Here, for outputting the alarm relevant to the contact between the vehicle M and the obstacle early, the vehicle control apparatus 100 can adopt a value greater than the first threshold, as the third threshold. Further, the third threshold may be the same value as the first threshold, or may be a value less than the first threshold. Further, the vehicle control apparatus 100 does not need to output both of the alarm relevant to the departure of the vehicle M from the running lane R1 and the alarm relevant to the contact of the vehicle M with the obstacle, and may output only an alarm that is earlier in timing.

What is claimed is:

1. A vehicle control apparatus configured to control a vehicle such that the vehicle runs along a running lane in a steering control range and a vehicle speed control range, the steering control range and the vehicle speed control range being previously set, the vehicle control apparatus comprising:
   a running state recognition unit configured to recognize a running state of the vehicle;
   a lateral position recognition unit configured to recognize a lateral position of the vehicle relative to the running lane and an orientation of the vehicle relative to the running lane;
   a departure margin time computation unit configured to compute a departure margin time based on the running state of the vehicle, the lateral position of the vehicle relative to the running lane and the orientation of the vehicle relative to the running lane, the departure margin time being a duration of time until the vehicle departs from the running lane in the steering control range and the vehicle speed control range;
   a hand-release duration time measurement unit configured to measure a hand-release duration time, the hand-release duration time being a duration time of a hand-release state of a driver of the vehicle;
   a driving return time estimation unit configured to estimate a driving return time based on the hand-release duration time, the driving return time being a duration of time until the driver in the hand-release state returns to driving operation; and
   a control unit configured to output an alarm to the driver based upon a difference resulting from subtracting the driving return time from the departure margin time being a first threshold or less.

2. The vehicle control apparatus according to claim 1, wherein
   the control unit is configured to execute an extension control of the departure margin time by at least one of deceleration of the vehicle and restriction of the steering control range, based upon the difference resulting from subtracting the driving return time from the departure margin time being a second threshold or less.

3. The vehicle control apparatus according to claim 1, wherein
   the vehicle control apparatus further comprises a driver state recognition unit configured to recognize whether the driver is in a low awake state, and
   the driving return time estimation unit is configured to estimate, in a case where the driver is recognized to be in the low awake state by the driver state recognition unit, the driving return time to be longer than in a case where the driver is recognized to be not in the low awake state.

4. The vehicle control apparatus according to claim 1, further comprising:
   an obstacle information acquisition unit configured to acquire obstacle information relevant to an obstacle around the vehicle; and
   a contact margin time computation unit configured to compute a contact margin time based on the running state of the vehicle and the obstacle information, the contact margin time being a duration of time until the vehicle comes into contact with the obstacle in the steering control range and the vehicle speed control range, wherein
   the control unit is configured to output the alarm to the driver based upon a difference resulting from subtracting the driving return time from the contact margin time being a third threshold or less.

5. A vehicle control apparatus configured to control a vehicle such that the vehicle runs along a running lane in a steering control range and a vehicle speed control range, the steering control range and the vehicle speed control range being previously set, the vehicle control apparatus comprising:
   a running state recognition unit configured to recognize a running state of the vehicle;
   an obstacle information acquisition unit configured to acquire obstacle information relevant to an obstacle around the vehicle;
   a contact margin time computation unit configured to compute a contact margin time, the contact margin time being a duration of time until the vehicle comes into contact with the obstacle in the steering control range and the vehicle speed control range;
   a hand-release duration time measurement unit configured to measure a hand-release duration time, the hand-release duration time being a duration time of a hand-release state of a driver of the vehicle;
   a driving return time estimation unit configured to estimate a driving return time for the driver based on the hand-release duration time, the driving return time being a duration of time until the driver in the hand-release state returns to the driving operation; and
   a control unit configured to output an alarm to the driver based upon a difference resulting from subtracting the driving return time from the contact margin time being a third threshold or less.

6. A vehicle control apparatus configured to control a vehicle such that the vehicle runs along a running lane in a steering control range and a vehicle speed control range, the steering control range and the vehicle speed control range being previously set, the vehicle control apparatus comprising:
   an alarm including at least one of a speaker or a display; and
   an Electronic Control Unit (ECU) configured to execute:
   a running state recognition unit configured to recognize a running state of the vehicle;
   a lateral position recognition unit configured to recognize a lateral position of the vehicle relative to the running lane and an orientation of the vehicle relative to the running lane;
   a departure margin time computation unit configured to compute a departure margin time based on the running state of the vehicle, the lateral position of the vehicle relative to the running lane and the orientation of the vehicle relative to the running lane, the departure margin time being a duration of time until the vehicle departs from the running lane in the steering control range and the vehicle speed control range;
   a hand-release duration time measurement unit configured to measure a hand-release duration time, the hand-release duration time being a duration time of a hand-release state of a driver of the vehicle;

a driving return time estimation unit configured to estimate a driving return time based on the hand-release duration time, the driving return time being a duration of time until the driver in the hand-release state returns to driving operation; and a control unit configured to cause the alarm to output at least one of a visual notification or an audio notification to the driver based upon a difference resulting from subtracting the driving return time from the departure margin time being a first threshold or less.

* * * * *